(12) United States Patent
Matsumoto et al.

(10) Patent No.: US 7,882,051 B2
(45) Date of Patent: Feb. 1, 2011

(54) CONTROL DEVICE AND A CONTROL METHOD FOR A FUEL CELL SYSTEM

(75) Inventors: Michihiko Matsumoto, Yokohama (JP); Takeaki Obata, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 843 days.

(21) Appl. No.: 11/815,139

(22) PCT Filed: Mar. 22, 2006

(86) PCT No.: PCT/IB2006/000639
§ 371 (c)(1), (2), (4) Date: Jul. 31, 2007

(87) PCT Pub. No.: WO2006/100569
PCT Pub. Date: Sep. 28, 2006

(65) Prior Publication Data
US 2008/0118799 A1 May 22, 2008

(30) Foreign Application Priority Data
Mar. 23, 2005 (JP) ............................. 2005-084789

(51) Int. Cl.
*G05B 13/02* (2006.01)
*G06E 1/00* (2006.01)
*G06E 3/00* (2006.01)
*G06F 15/18* (2006.01)
*G06G 7/00* (2006.01)
(52) U.S. Cl. ...................................................... 706/23
(58) Field of Classification Search .................... 706/23
See application file for complete search history.

(56) References Cited

U.S. PATENT DOCUMENTS

| | | | |
|---|---|---|---|
| 2001/0014414 A1 | 8/2001 | Okamoto et al. | |
| 2004/0030469 A1* | 2/2004 | MacBain | 701/22 |
| 2004/0033399 A1 | 2/2004 | Imamura et al. | |

FOREIGN PATENT DOCUMENTS

| | | |
|---|---|---|
| EP | 1 408 384 A1 | 4/2004 |
| JP | 2000-357526 | 12/2000 |
| WO | 2004/059767 A2 | 7/2004 |

OTHER PUBLICATIONS

Nitsche, 'Onboard diagnostic concept for fuel cell vehicles using adaptive modeling': 2004, IEEE, 0-7803-8310, pp. 127-132.*

* cited by examiner

*Primary Examiner*—Michael B. Holmes
*Assistant Examiner*—Peter Coughlan
(74) *Attorney, Agent, or Firm*—Young Basile

(57) ABSTRACT

A control device and method for a fuel cell system accurately learns output characteristics of fuel cell even when the output characteristics of fuel cell change due to changes in fuel cell temperature. The method and device generate power by supplying fuel and oxidant gases. The control device has a memory portion that memorizes output characteristics of fuel cell that change with the temperatures of fuel cell, and that become the base output characteristics, for each of the temperatures. An output characteristics learning portion learns the relationship between the output characteristics that become the base output characteristics and the actual output characteristics of fuel cell. The output characteristics learning portion prohibits learning when an actual current is less than a first predetermined current and more than a second predetermined current.

31 Claims, 17 Drawing Sheets

CONTROL DEVICE AND A CONTROL METHOD FOR A FUEL CELL SYSTEM

CROSS-REFERENCE TO RELATED APPLICATIONS

The present application claims priority of Japanese Patent Application No. 2005-084789, filed on Mar. 23, 2005, the entire content of which is expressly incorporated by reference herein.

TECHNICAL FIELD OF THE INVENTION

The present invention pertains to a control device and a control method for a fuel cell system that learns the output characteristics of the fuel cell.

BACKGROUND

In recent years, due to environmental issues, fuel cell technology has gained attention as an electric and motive power source that allows for clean emissions and high-energy efficiency.

A fuel cell system is an energy exchange system that supplies hydrogen gas or gas with a high concentration of hydrogen as the fuel and oxygen gas or air containing oxygen as the oxidant to a composite consisting of an electrolyte and an electrode medium, which is the fuel cell, causing an electrochemical reaction that changes the chemical energy to electric energy.

In general, the change in the temperature of the fuel cell causes the electric current/voltage characteristics of the fuel cell to change. One example of a system that is already known and disclosed in Unexamined Japanese Patent Application Publication No. 2000-357526, is a system that learns electric current/voltage characteristics that have this temperature sensitivity. In Unexamined Japanese Patent Application Publication No. 2000-357526, a linear approximation formula is produced of the relationship between the electric current and voltage of the fuel cell and this approximation formula is used to learn the current/voltage characteristics of the fuel cell.

The above listed issues lead to a difficulty in performing accurate learning of the current/voltage characteristics in relation to the change in temperature.

BRIEF SUMMARY OF THE INVENTION

Sufficient data may be needed for the current and voltage obtained under steady operating conditions in relation to all the combinations of assumed temperatures and current for when the fuel cell is in operation in order to accurately learn the current/voltage characteristics for temperature and current changes in the fuel cell.

However, it is difficult to obtain sufficient data for all combinations of the assumed current and temperatures for the actual fuel cell.

In addition, even if a fixed temperature and current/voltage range is set for the operating conditions for a fuel cell system, it is difficult to change the combination of temperature and current at will. The reason for this is that the temperature of a fuel cell is determined by the relationship between the heat generated by the fuel cell and the cooling performance of the fuel cell system. Therefore, it is difficult to obtain sufficient data for combinations of the assumed current and temperatures for the range that is set as the operating conditions for the actual fuel cell system.

One aspect of the present invention takes such technical problems into account and proposes to provide an improvement by minimizing the abrupt voltage change associated with the change of the battery voltage, thus protecting the inverter, the motor-generator, etc. from damage caused by the abnormal current due to the abrupt voltage change.

The present invention was contrived to provide a control device and a control method for a fuel cell system that allows for accurate leaning of the output characteristics of the fuel cell even when the output characteristics of the fuel cell change as a result of changes in the temperature of the fuel cell.

A fuel cell controlling system applying the present invention is characterized in that the control device and control method of the fuel cell system that generates power by supplying fuel gas and oxidant gas comprise a memory means that memorizes the output characteristics of said fuel cell that change in accordance with the temperatures of the fuel cell, and which become the base output characteristics, for each of said temperatures and an output characteristics learning means that learns the relationship between said base output characteristics and the actual output characteristics of the fuel cell. The learning means is adapted to prohibit learning when an actual current is less than a first predetermined current and more than a second predetermined current. The learning means can also or alternatively be adapted to prohibit learning when there is no change in an actual output current for an operating condition of the fuel cell from a previously learned actual output current at the operating condition.

According to the present invention, a control device and control method for a fuel cell system can be provided that accurately learn the output characteristics of the fuel cell even when the output characteristics of the fuel cell change as a result of changes in the temperature of the fuel cell.

EXPLANATION OF REFERENCE SYMBOLS

Figure 1:
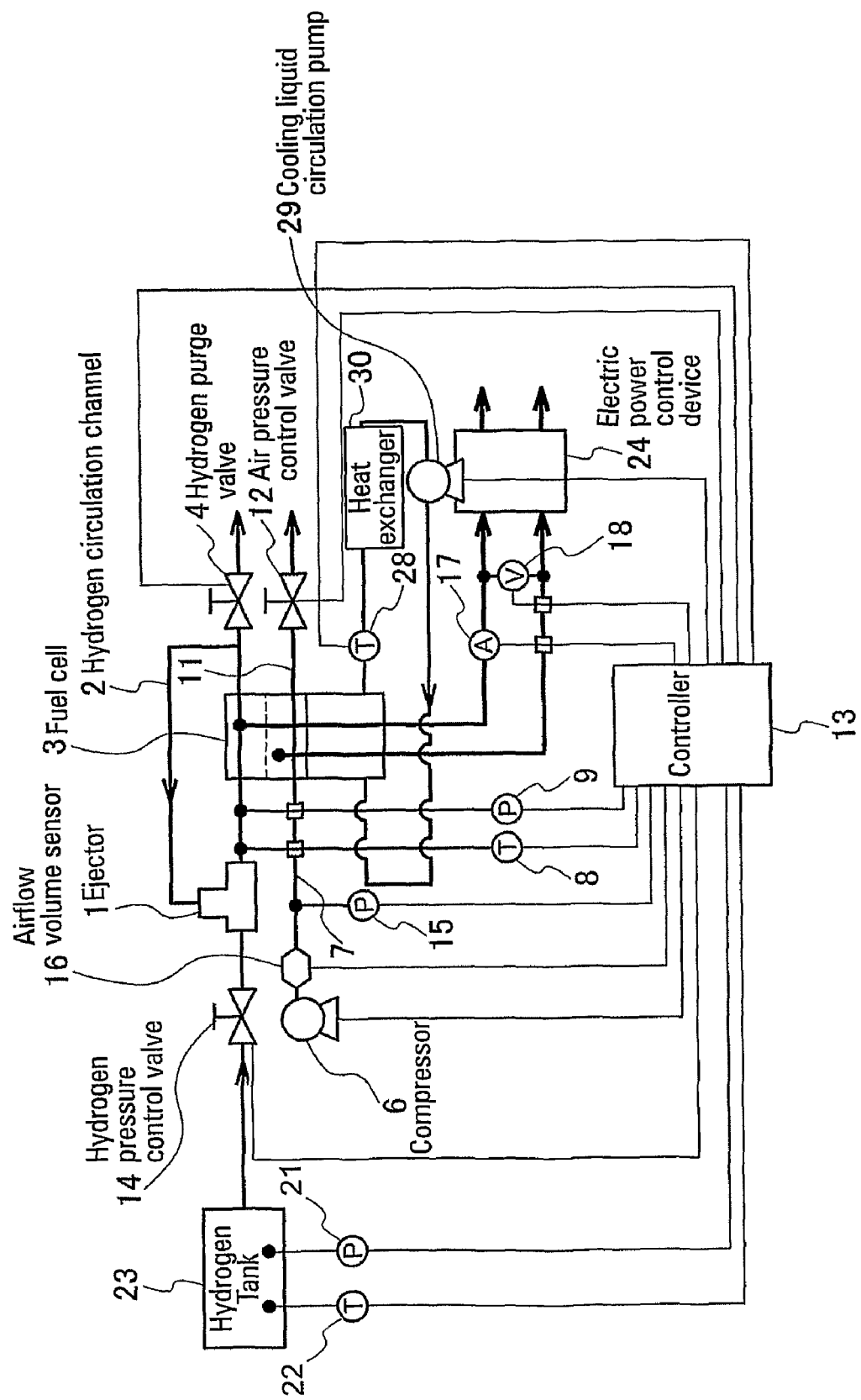
FIG. 1 details a block diagram showing the constitution of the fuel cell system pertaining to an embodiment of the present invention.

1 . . . Ejector
2 . . . Hydrogen circulation channel
3 . . . Fuel cell stack (fuel cell)
4 . . . Hydrogen purge valve
6 . . . Compressor
7 . . . Air supply channel
8 . . . Hydrogen supply inlet temperature sensor
9 . . . Hydrogen supply inlet pressure sensor
11 . . . Air exhaust channel
12 . . . Air pressure control valve
13 . . . Control device (controller)
14 . . . Hydrogen pressure control valve
15 . . . Air supply inlet pressure sensor
16 . . . Airflow volume sensor
17 . . . Electric current sensor
18 . . . Electric voltage sensor
21 . . . Tank temperature sensor
22 . . . Tank pressure sensor
23 . . . Hydrogen tank
24 . . . Electric power control device
28 . . . Cooling liquid temperature sensor
29 . . . Cooling liquid circulation pump
30 . . . Heat exchanger
35 . . . Output characteristics learning portion (output characteristic learning means)
36 . . . Memory portion (memory means)
37 . . . Display device
38 . . . Input device
39 . . . Output device
40 . . . Base output calculation portion (base output calculation means)
41 . . . Output difference learning portion (output difference learning means)
50 . . . Base voltage calculation portion (base voltage calculation means)
51 . . . Voltage difference learning portion (voltage difference learning means)
52 . . . Learning execution-determining portion (learning execution-determining means)
53 . . . Steady-state determining portion (steady-state determining means)
54 . . . Current difference determining portion (current difference determining means)
55 . . . Current range determining portion (current range determining means)

DETAILED DESCRIPTION OF EMBODIMENTS OF THE INVENTION

An explanation of an embodiment of the present invention is provided below with reference to the drawings. It should be noted that the same or similar reference symbols have been used for the same or similar parts described in the drawings.

The constitution of the fuel cell system pertaining to an embodiment of the present invention is explained with reference to FIG. 1. This fuel cell system is provided with fuel cell stack 3 in which fuel gas containing hydrogen and oxidant gas containing oxygen are supplied to generate power, a hydrogen gas system line for supplying hydrogen gas as one example of fuel gas supplied to fuel cell stack 3, an air system line for supplying air as one example of the oxidant gas supplied to fuel cell stack 3, a cooling system line for cooling the heat produced when power is generated by fuel cell stack 3, electric power control device 24 that controls the electric power output from fuel cell stack 3 and controller 13 that performs overall control of the fuel cell system.

A fuel cell system is a device that directly converts the energy in fuel to electric energy and fuel cell stack 3 comprises multiple layers of a membrane/electrode composite consisting of an electrolyte membrane and a pair of electrodes (positive electrode and negative electrode) provided on either side of the electrolyte membrane stacked via a separator. Of the pair of electrodes, fuel gas containing hydrogen is supplied to the positive electrode (the anode) and oxidant gas containing oxygen is supplied to the other electrode (the cathode) and the electrochemical reactions shown in Formulae (1) and (2) that occur on the surface of the electrolyte membrane side of the pair of electrodes is utilized to extract electric energy from the electrodes.

Anode reaction: $H_2 \rightarrow 2H^+ + 2e^-$ (1)

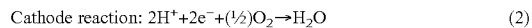

Cathode reaction: $2H^+ + 2e^- + (\frac{1}{2})O_2 \rightarrow H_2O$ (2)

There are two known methods for supplying the fuel gas to the anode. One is to supply it directly from the hydrogen storage device and the other is to modify the fuel containing the hydrogen and supply gas containing hydrogen. Examples of fuels containing hydrogen are natural gas, methanol and gasoline. Air is generally used as the oxidant gas supplied to the cathode.

The hydrogen gas system line comprises hydrogen tank 23, which is placed upstream from fuel cell stack 3, hydrogen pressure control valve 14, which is connected to hydrogen tank 23, hydrogen circulation channel 2, which connects the hydrogen gas exhaust outlet and hydrogen gas supply inlet of fuel cell stack 3, ejector 1 arranged on the contact point where hydrogen circulation channel 2 and the hydrogen gas supply channel come into contact, and hydrogen purge valve 4 connected to the hydrogen gas exhaust outlet of fuel cell stack 3.

Hydrogen tank 23, hydrogen pressure control valve 14, ejector 1 and the hydrogen gas supply inlet of fuel cell stack 3 (anode) are serially connected via the hydrogen gas supply channel. The hydrogen gas exhaust outlet of fuel cell stack 3 (anode) and hydrogen purge valve 4 are connected via the hydrogen gas exhaust channel. Hydrogen circulation channel 2 connects the hydrogen gas supply channel with the hydrogen gas exhaust channel.

Hydrogen tank 23 stores hydrogen gas at a high pressure. Hydrogen pressure control valve 14 decompresses the hydrogen gas pressure to the pressure demanded by fuel cell stack 3 (operating pressure). The non-reacting hydrogen gas (exhaust hydrogen gas) exhausted from fuel cell stack 3 passes through hydrogen circulation channel 2 and is re-supplied to fuel cell stack 3. Ejector 1 mixes the exhaust hydrogen gas that has passed through hydrogen circulation channel 2 with the hydrogen gas supplied from hydrogen tank 23. Hydrogen purge valve 4 is normally closed, but is opened when exhausting residual gas or liquid in the hydrogen gas system line or the anode of fuel cell stack 3 that is not required for generating power or that lowers the power generation efficiency.

The hydrogen gas in hydrogen tank 23 passes through hydrogen pressure control valve 14 and ejector 1 and is supplied to the hydrogen gas supply inlet of fuel cell stack 3. The exhaust hydrogen gas exhausted from the hydrogen gas exhaust outlet of fuel cell stack 3 passes through hydrogen circulation channel 2 and ejector 1 and is re-supplied to the hydrogen gas supply inlet.

The temperature and pressure of the hydrogen gas at the hydrogen gas supply inlet of fuel cell stack 3 are measured by hydrogen supply inlet temperature sensor 8 and hydrogen supply inlet pressure sensor 9, respectively. The control for hydrogen pressure control valve 14 is performed by the pressure measured by hydrogen supply inlet pressure sensor 9. In addition, the temperature and pressure inside of hydrogen tank 23 are measured by tank temperature sensor 21 and tank pressure sensor 22, respectively.

The air system line comprises compressor 6, which is arranged upstream of fuel cell stack 3, airflow volume sensor 16, which is connected between compressor 6 and the air supply inlet of fuel cell stack 3 (cathode) and air pressure control valve 12, which is connected to the air exhaust outlet of fuel cell stack 3.

Compressor 6, airflow volume sensor 16 and the air supply inlet of fuel cell stack 3 are serially connected by air supply channel 7. The air exhaust outlet of fuel cell stack 3 and air pressure control valve 12 are connected via air exhaust channel 11.

Compressor 6 compresses the air supplied to the cathode of fuel cell stack 3 and sends it to air supply channel 7. Airflow volume sensor 16 measures the volume of airflow supplied to the cathode of fuel cell stack 3. Air pressure control valve 12 adjusts the pressure of the air supplied to the cathode of fuel cell stack 3.

The air sent from compressor 6 passes through airflow volume sensor 16 and is supplied to the air supply inlet of fuel cell stack 3. The exhaust air exhausted from the air exhaust outlet of fuel cell stack 3 passes through air pressure control valve 12 and is exhausted out of the system. The pressure of the air at the air supply inlet of fuel cell stack 3 is measured by air supply inlet pressure sensor 15 and is controlled by air pressure control valve 12.

The cooling system line comprises a cooling liquid channel through which cooling liquid flows, cooling liquid temperature sensor 28 arranged on top of the cooling liquid channel, cooling liquid circulation pump 29 and heat exchanger 30. The cooling liquid channel is connected to the separator inside of fuel cell stack 3 and forms one closed circulation channel. Heat is generated when fuel cell stack 3 generates power. The cooling liquid takes away the heat generated by fuel cell stack 3, or in other words, cools it. On the other hand, heat exchanger 30 removes the heat from the cooling liquid and emits it from the system, or in other words, radiates it. Cooling liquid circulation pump 29 circulates the cooling liquid in a fixed direction inside of the cooling liquid channel.

In this manner, the heat generated by the fuel cell is emitted from the system via the cooling liquid. Cooling liquid temperature sensor 28 measures the temperature of the cooling liquid and the operation of cooling liquid circulation pump 29 and heat exchanger 30 are controlled in accordance with the temperature of the cooling liquid.

The current output from fuel cell stack 3 is measured by current sensor 17 and the voltage output from fuel cell stack 3 is measured by voltage sensor 18. The electric power taken from fuel cell stack 3 is controlled by electric power control device 24.

Electric power control device 24 is arranged between fuel cell stack 3 and the electric load and controls the electric power generated by fuel cell stack 3. Electric power control device 24 consists of a pressure raising/lowering type of DC/DC converter, for example. The pressure raising conversion and pressure lowering conversion of the DC/DC converter are each performed using different switching element operations. Thus, by controlling the control signal applied to the switching element to a duty ratio, the desired voltage can be output. When raising the pressure, the switching element is controlled to output a voltage that is greater than the input voltage and when lowering the voltage, the switching element is controlled to output a voltage that is less than the input voltage.

For the embodiment of the present invention, the operating pressure of fuel cell stack 3 is a variable pressure. In other words, the operating pressure is raised when the output taken from fuel cell stack 3 is high and lowered when the output is low.

When water overflows on the inside of fuel cell stack 3 (from hereafter referred to as flooding), or the operating pressure of the fuel cell stack is lowered, hydrogen purge valve 4 is opened and the hydrogen gas that is present inside of hydrogen circulation channel 2 and fuel cell stack 3 is exhausted.

The operation of each constituent of the fuel cell system explained according to FIG. 1, below, is controlled by controller 13.

Figure 2:
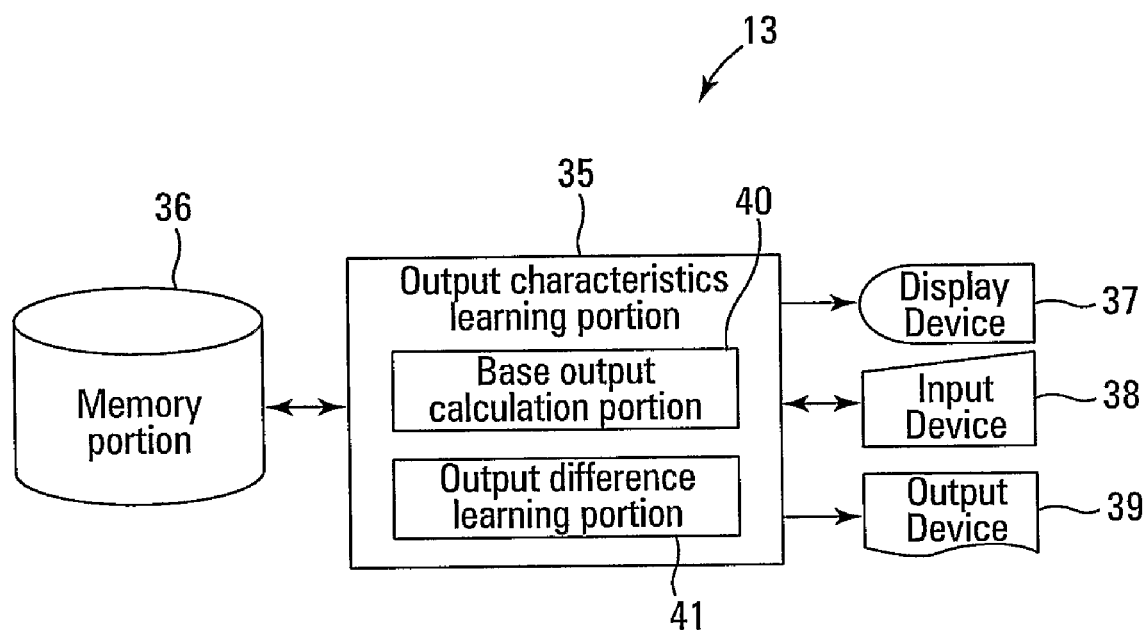
FIG. 2 details a block diagram showing the detailed constitution of the controller in FIG. 1.

Next is provided an explanation of the constitution of the function/means of the controller shown in FIG. 1, with reference to FIG. 2. Controller 13 is comprised of at least a memory means (memory portion 36) that memorizes the output characteristics of fuel cell stack 3 that become the base output characteristics, for each of the temperatures of fuel cell stack 3 and an output characteristics learning means (output characteristics learning portion 35) that learns the relationship between the output characteristics that become the base characteristics and the actual output characteristics of fuel cell stack 3.

Here, the output characteristics of fuel cell stack 3 represent two different relationships of either the electric current, electric voltage or electric power output from fuel cell stack 3. Since the output characteristics memorized by memory portion 36, become the base for what is learned by output characteristics learning portion 35, they are called the "base output characteristics". Generally speaking, the output characteristics of fuel cell stack 3 are known to change in accordance with the temperature of fuel cell stack 3. Therefore, the output characteristics that become the base characteristics are memorized for each temperature by memory portion 36. The actual output characteristics of fuel cell stack 3 are the output characteristics obtained from the current/voltage values measured by electric current sensor 17 and electric voltage sensor 18, or in other words, the output characteristics taken from fuel cell stack 3.

Output characteristics learning portion 35 is provided with a base output calculation means (base output calculation portion 40) that calculates either the base current, base voltage or base power of the fuel cell using the output characteristics that become the base from either the current, voltage or power output from fuel cell stack 3; and an output difference learning means (output difference learning portion 41) that learns the input/output relationship on the basis of the input, which is either the current, voltage or power output from fuel cell stack 3 and the output, which is the difference or ratio between either the base current, base voltage or base power and either the current, voltage or power output from the fuel cell.

Here, the electric current, voltage and power output from fuel cell stack 3 mean the actual electric current, voltage and power of fuel cell stack 3 and are obtained from the electric current/voltage values measured by electric current sensor 17 and electric voltage sensor 18.

Controller 13 can be configured as an ordinary computer system comprising a CPU, display device 37, input device 38, output device 39 and a temporary memory device (main memory device). Output characteristics learning portion 35 comprises a CPU and a temporary memory device (main memory device) connected to the CPU. Memory portion 36 is a recording portion that uses a commonly known magnetic tape, magnetic drum, magnetic disk, optical disk, opto-magnetic disk, or a semiconductor memory, such as a ROM or RAM. Display device 37 comprises a display device, such as a CRT or a liquid crystal. Input device 38 comprises a keyboard, mouse, light pen or flexible disk device. Also, output device 39 comprises a printer device, or the like.

Figure 3:
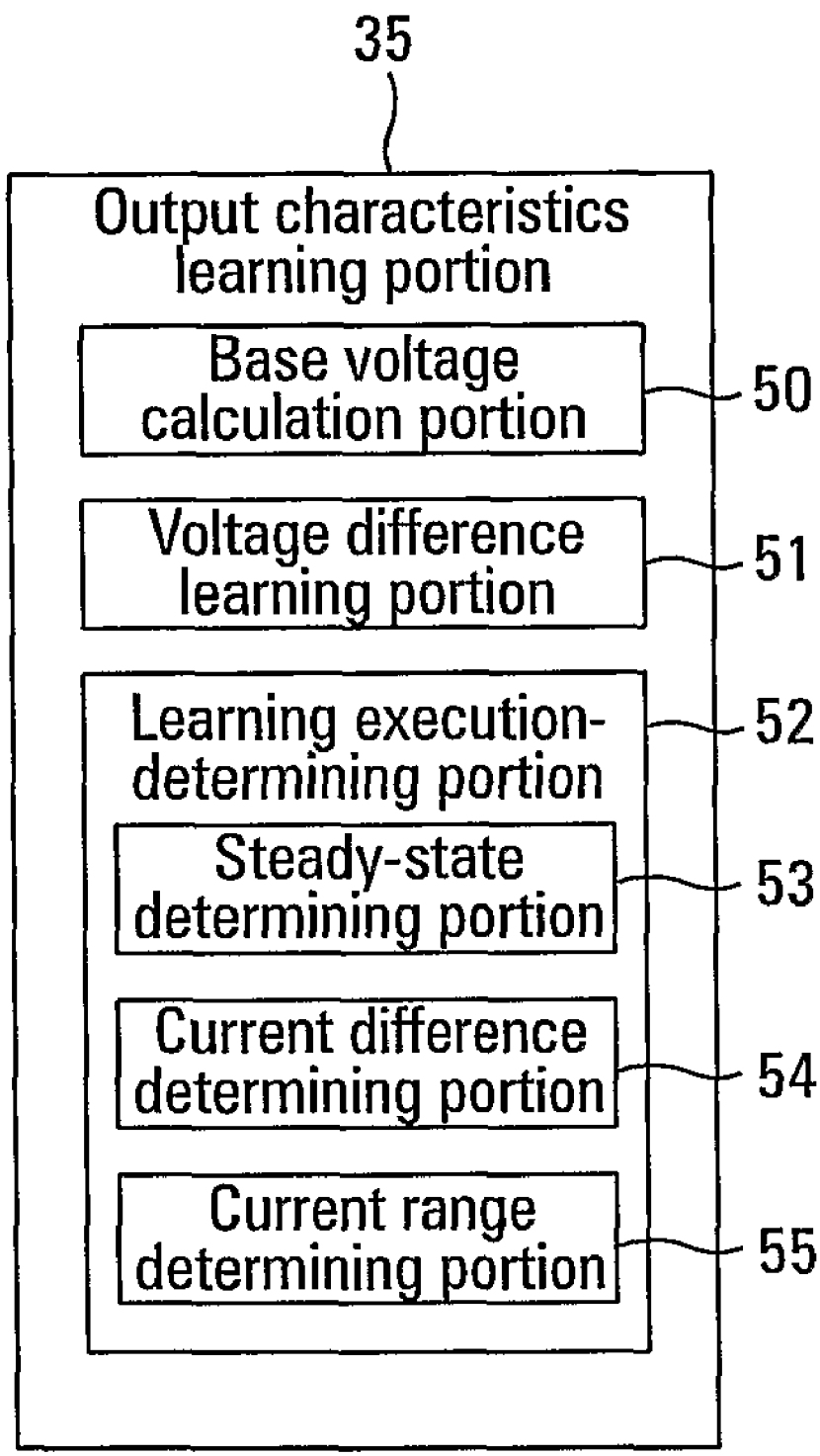
FIG. 3 details a block diagram showing the detailed constitution of the output characteristics learning portion in FIG. 2.

FIG. 3 is a block diagram showing a more concrete example of the constitution of output characteristics learning portion 35, shown in FIG. 2. In this Figure, the output characteristics of fuel cell stack 3 are the current/voltage characteristics (IV characteristics) representing the relationship between the electric current and electric voltage output from fuel cell stack 3.

As explained above, the fuel cell system shown in FIG. 1 has electric current sensor 17, as the electric current detection means for detecting the actual electric current of fuel cell stack 3, and electric voltage sensor 18, as the electric voltage detection means for detecting the actual electric voltage of fuel cell stack 3.

Figure 10:
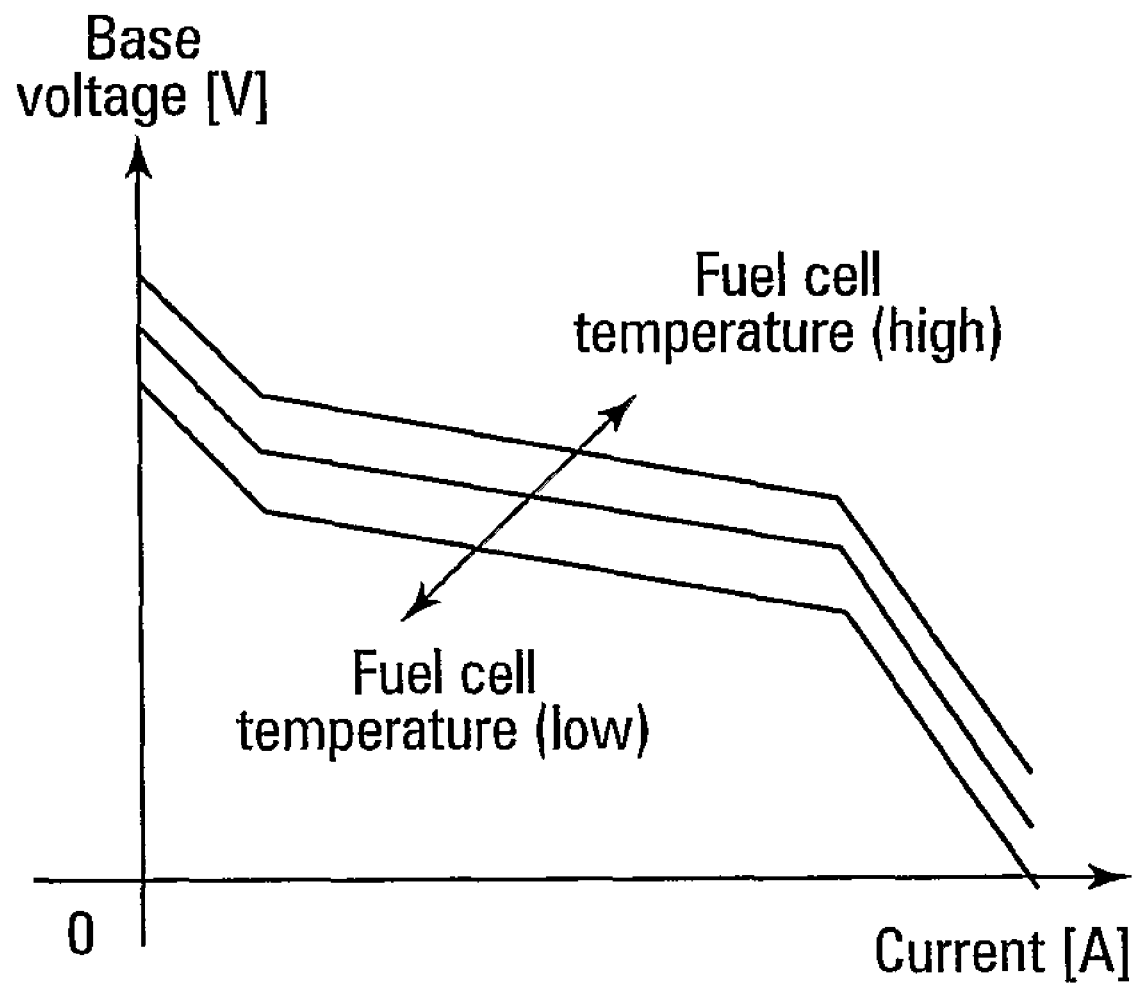
FIG. 10 details a graph showing one example of the current/voltage characteristics for each temperature of the fuel cell stack memorized by the memory portion.

In FIG. 3, output characteristics learning portion 35 is provided with a base voltage calculation means (base voltage calculation portion 50) that calculates the base voltage of fuel cell stack 3 using the current/voltage characteristics that become the base from the operating conditions of fuel cell stack 3, an electric voltage difference learning means (voltage difference learning portion 51) that learns the input/output relationship on the basis of the input, which is the actual electric current and the output, which is the difference between the base electric voltage and the actual electric voltage, and a learning execution-determining means (learning execution—determining portion 52) that permits the execution of the learning as long as the operating conditions of fuel cell stack 3 are within a range in which the input/output relationship is stable and learning is possible. Here, the actual electric current is the electric current output from fuel cell stack 3 and measured by electric current sensor 17 and the actual electric voltage is the electric voltage output from fuel cell stack 3 and measured by electric voltage sensor 18. In this case, as shown in FIG. 10, memory portion 36 memorizes the electric current/voltage characteristics that become the base current/voltage characteristics for each temperature of fuel cell stack 3.

Voltage difference learning portion 51 executes the learning only when learning execution-determining portion 52 permits the learning of the input/output relationship. Base output calculation portion 40 in FIG. 2 corresponds to base voltage calculation portion 50 in FIG. 3 and output difference learning portion 41 in FIG. 2 corresponds with voltage difference learning portion 51 in FIG. 3.

Learning execution-determining portion 52 comprises a steady-state determining means (steady-state determining portion 53) that permits the execution of the learning as long as the operating conditions of fuel cell stack 3 are in a steady state, an electric current difference determining means (electric current difference determining portion 54) that prohibits the execution of the learning when there is not a change of a predetermined value or more in the actual electric current in relation to the actual current that was generated when the execution of the learning was permitted, and an electric current range determining means (electric current range determining portion 55) that prohibits the execution of the learning when the actual current is less than a first predetermined value or more than a second predetermined value, which is larger than said first predetermined value.

Here, steady-state determining portion 53 is a means that permits the execution of the learning when the dispersion value of the operating conditions of fuel cell stack 3 becomes less than a predetermined value. The operating conditions of fuel cell stack 3 are either the actual voltage, the actual current or the actual electric power output by fuel cell stack 3, the utilization the operating pressure of fuel cell stack 3, the utilization rate of the fuel gas (hydrogen gas) or the utilization rate of the oxidization gas (air) or a combination of a plurality of these. Voltage difference learning portion 51 executes the learning only when learning of all of the input/output relationships for steady-state determining portion 53, current difference determining portion 54 and current range determining portion 55 is permitted.

Figure 4:
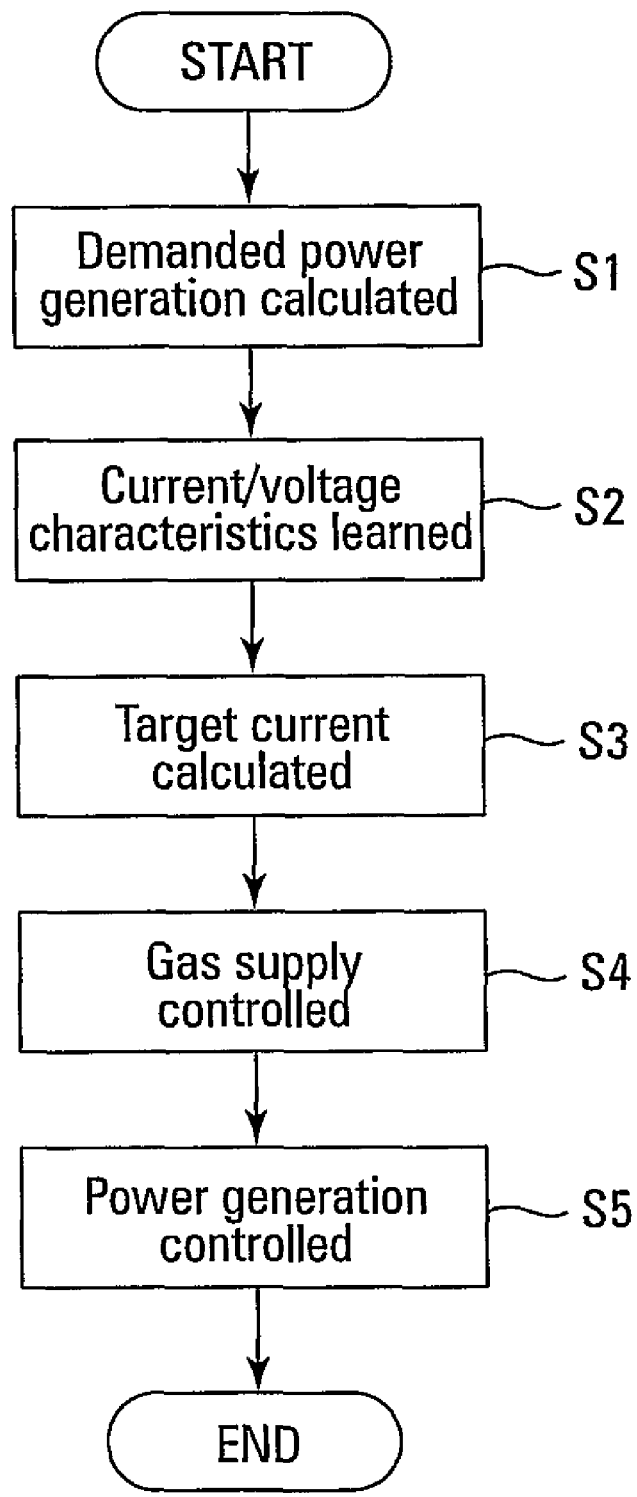
FIG. 4 details a flowchart showing one example of the control method for a fuel cell system using the control device (controller) for the fuel cell system shown in FIG. 1.

An explanation is provided for the control method for the fuel cell system shown in FIG. 1, with reference to FIG. 4. The flowchart in FIG. 4 shows the method in which controller 13, shown in FIG. 1, learns the output characteristics of fuel cell stack 3 and controls the gas supply and power generation of the fuel cell system. The flowchart in FIG. 4 is executed in a predetermined time cycle (for example, a 10 msec. cycle).

First, controller 13 calculates the opening of the accelerator installed in the vehicle and the demanded power generation for the fuel cell system based on the speed of the vehicle (Step S1). Output characteristic learning portion 35 learns the electric current/voltage characteristics of fuel cell stack 3 (Step S2). Then controller 13 calculates the target electric current from the demanded power generation based on the result of said learning (Step S3), performs control of the gas supply of hydrogen gas and air based on the target electric current (Step S4), and controls the power generation of fuel cell stack 3 (Step S5).

Next is provided a detailed explanation of the processing operations performed for Steps S1~S5.

Figure 5:
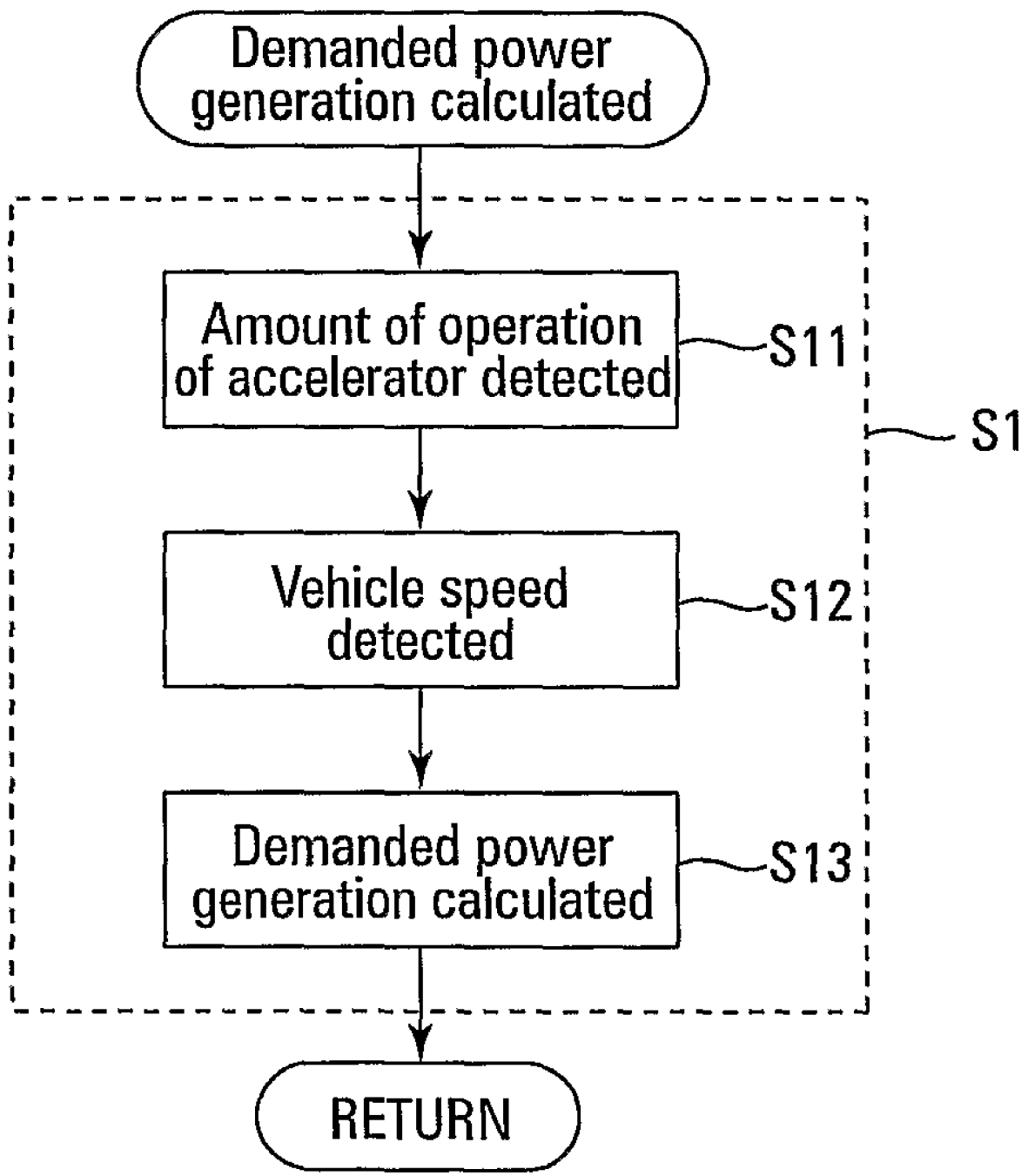
FIG. 5 details a flowchart showing the detailed processing operation for Step S1 in FIG. 4.

First, the processing operation for Step S1 in FIG. 4 will be explained with reference to FIG. 5. Here, the demanded power generation is calculated based on the operating conditions of the electric load connected to the fuel cell system. For example, the process used when a fuel cell system is installed in a hybrid-type electric vehicle is shown in the flowchart in FIG. 5.

Figure 9:
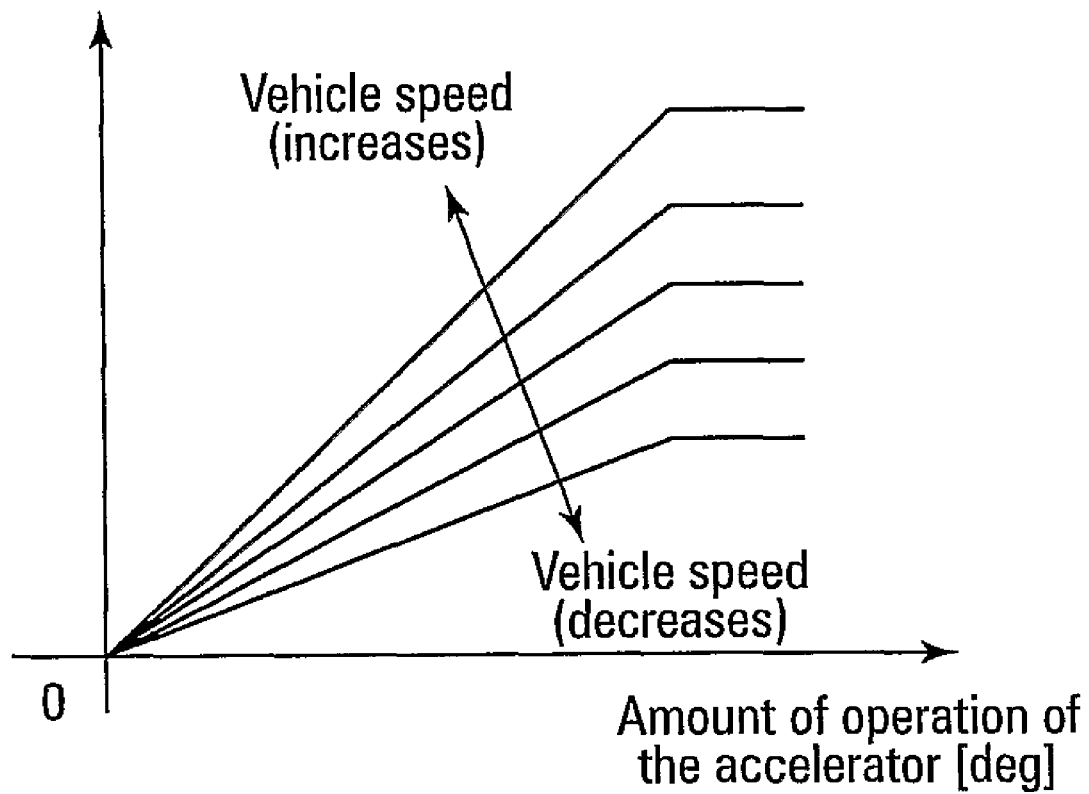
FIG. 9 details a data map showing the relationship between the amount of operation of the accelerator and demanded power generation based on the speed of the vehicle that is equipped with the fuel cell system shown in FIG. 1.

At Step S11, the amount of operation of the accelerator performed by the driver is detected based on the output from the accelerator sensor provided in the vehicle. At Step S12, the speed of the vehicle is detected based on the output of the vehicle speed sensor provided in the vehicle. Lastly, at Step S13, the demanded power generation is calculated. The demanded power generation is calculated based on the amount of operation of the accelerator and the speed of the vehicle using the mapped data shown in FIG. 9.

Figure 6:
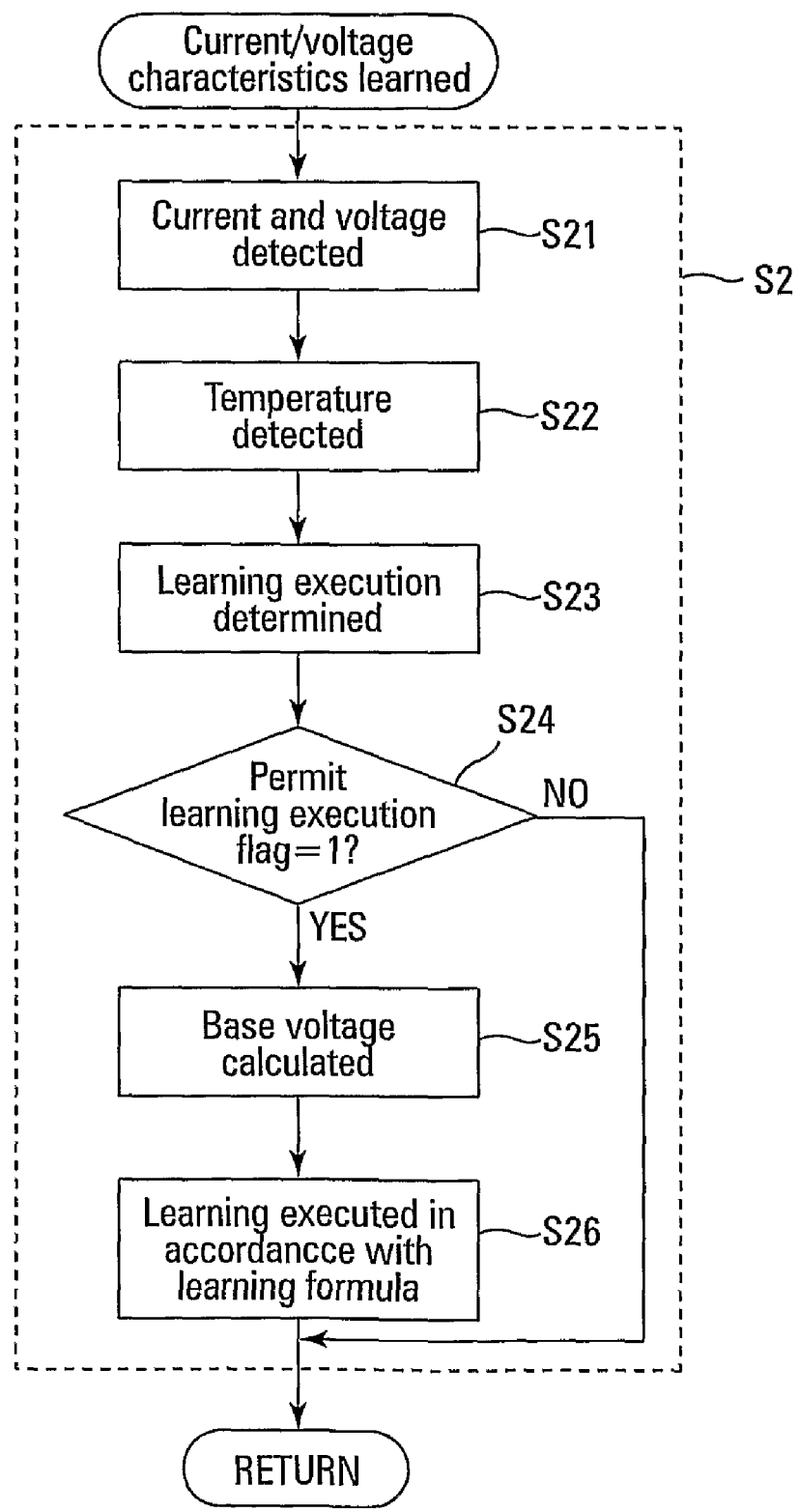
FIG. 6 details a flowchart showing the processing operation for learning the current/voltage characteristics for Step S2 in FIG. 4.

Next is provided an explanation of the processing operation for learning the electric current/voltage characteristics for Step S2 in FIG. 4, with reference to FIG. 6.

(a) At Step S21, output characteristics learning portion 35 utilizes electric current sensor 17 and electric voltage sensor 18 to detect the electric current and electric voltage taken from the fuel cell stack, the process moves to Step S22, and the temperature of fuel cell stack 3 is either detected or estimated.

Possible methods for detecting or estimating the temperature of fuel cell stack 3 are a direct detection method whereby a temperature sensor is directly installed on fuel cell stack 3, a method in which the temperature of fuel cell stack 3 is estimated from the temperature of the cooling liquid, or a method in which the temperature of fuel cell stack 3 is estimated from the temperature of the exhaust hydrogen gas or the exhaust air. When estimating the temperature from the temperature of the cooling liquid, the temperature of the cooling liquid can be measured by using cooling liquid temperature sensor 28 arranged in the vicinity of the cooling liquid outlet for the fuel cell. The temperature of the cooling liquid measured by cooling liquid temperature sensor 28 can be the temperature of the fuel cell. In addition, another possible method would be to obtain the average of the temperatures detected at the cooling liquid inlet and outlet of fuel cell stack 3 and use this as the temperature of fuel cell stack 3 or use the temperature of a place that corresponds to the operating load of fuel cell stack 3.

(b) Next, at Step S23, learning execution-determining portion 52 performs the learning execution determination. The purpose of the learning execution determination is to eliminate conditions which may cause incorrect learning when the changes in the current/voltage characteristics of fuel cell stack 3 are learned. When learning execution-determining portion 52 determines that learning can be executed, the permit learning execution flag is set to 1 and when it determines that learning cannot be executed, the permit learning execution flag is set to 0. The processing operation that takes place at Step S23 is described in detail below with reference to the flowchart in FIG. 7.

(c) Next, at Step S24, the permit learning execution flag is determined. If the permit learning execution flag is 1, the process proceeds to Step S25, and if the permit learning execution flag is 0, the current/voltage characteristics learning process flow shown in FIG. 6 is ended.

(d) Next, at Step S25, base voltage calculation portion 50 calculates the base voltage of fuel cell stack 3. More specifically, the base voltage is calculated using current/voltage characteristics for each temperature, as shown in FIG. 10, that become the base characteristics from the actual current detected at Step S21 and the temperature of fuel cell stack 3 that was either detected or estimated at Step S22. The two-dimensional mapped data in FIG. 10 shows the current/voltage characteristics with the actual current and temperature of the fuel cell as the input and the base voltage as the output. Therefore, base voltage calculation portion 50 inputs the actual current detected at Step S21 and the temperature detected or estimated at Step S22, and obtains the corresponding base voltage as the output, as shown in the two-dimensional mapped data in FIG. 10. In addition, mapped data and functions can also be applied as another method for calculating the base voltage by using the changes in the current/voltage characteristics for the operating conditions, such as the operating pressure, of fuel cell stack 3 as the input and the base voltage as the output.

Figure 11:
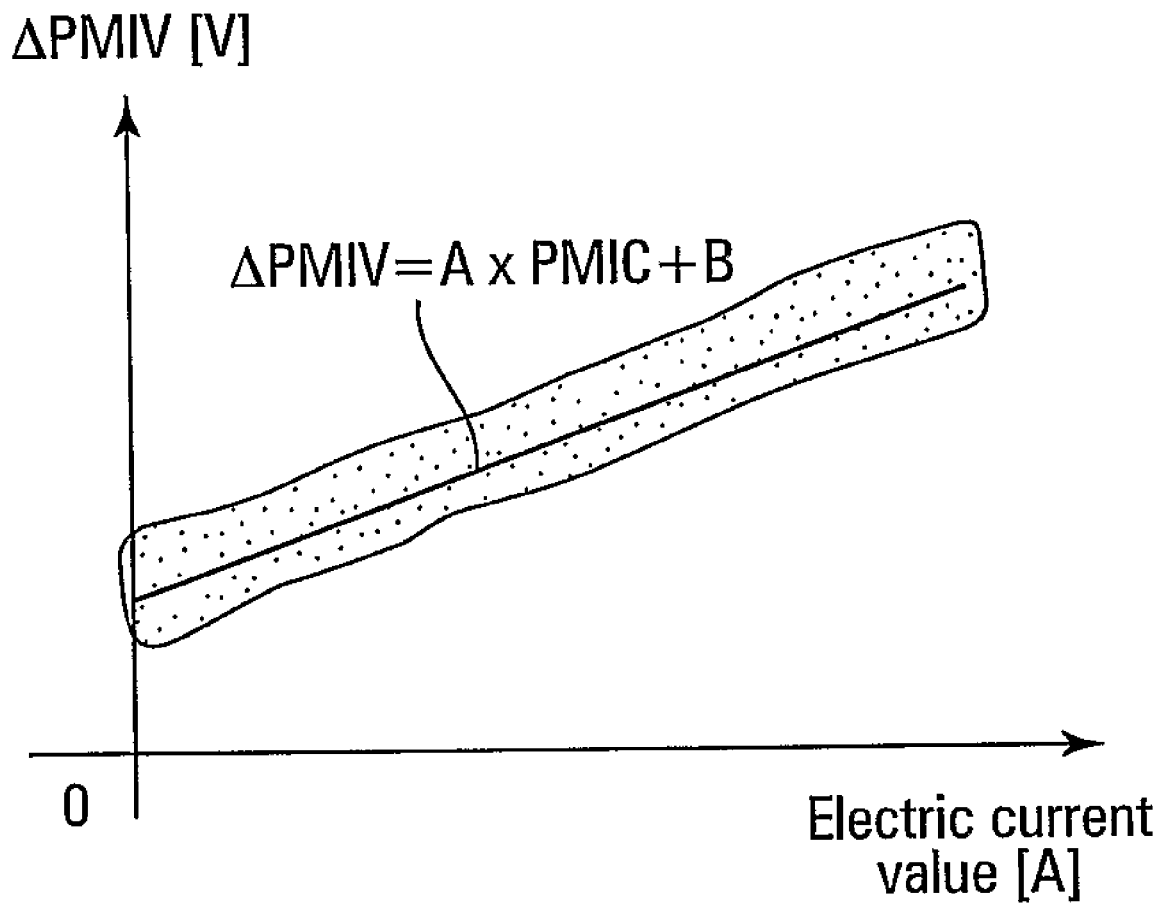
FIG. 11 details a graph showing the relationship of the difference ($\Delta PMIV$) between the base voltage calculated at Step S25 and the actual voltage, in relation to the actual current, PMIC, of the fuel cell stack.

(e) Next, at Step S26, voltage difference learning portion 51 executes the learning of the current/voltage characteristics of fuel cell stack 3 using the learning formula shown below. Here, a linear function such as that shown in Formula (3) is used to learn the voltage changes in the actual current/voltage characteristics in relation to the current/voltage characteristics that become the base characteristics of fuel cell stack 3. Formula (3) shows the relationship in the difference, $\Delta PMIV$, between the base voltage calculated at Step S25 and the actual voltage, PMIV, in relation to the actual current, PMIC, of fuel cell stack 3. As shown in FIG. 11, the changes in the current/voltage characteristics of fuel cell stack 3 are learned by calculating learning parameters A and B in Formula (3). In this manner, voltage difference learning portion 51 learns the changes in the current/voltage characteristics of fuel cell stack 3 by approximating the relationship between the actual current and the difference between the base voltage and the actual voltage as a linear function. The symbol, "k" represents the number of times that the learning is executed.

$$\Delta PMIV(k)=A(k)\times PMIC+B(k) \qquad (3)$$

Learning parameters A and B provide the characteristics that occasionally change by the minute for the changes in current/voltage characteristics of fuel cell stack 3 that take place with the passage of time. In addition, measurement errors due to the effects of the resolution of voltage sensor 18 are included in the actual voltage of fuel cell stack 3. Therefore, it is desirable to apply an adaptive parameter-estimating algorithm, such as the well-known RLS (recursive least-squares) algorithm. RLS is used in the field of adaptive control and changes the format of the conventional least-squares method to a format in which the calculation can be performed in real time.

Since the RLS that references formulae (4) through (12) provides characteristics in which learning parameters can be statistically calculated, incorrect learning of measurement errors can be prevented. Also, by setting the weighting coefficient $\lambda$ to more than zero, but less than 1, the weight of the past data in relation to the current data can be changed. Due to this, learning parameters A and B can be made to follow the changes that take place in the current/voltage characteristics of fuel cell stack 3 with the passage of time.

Figure 12:
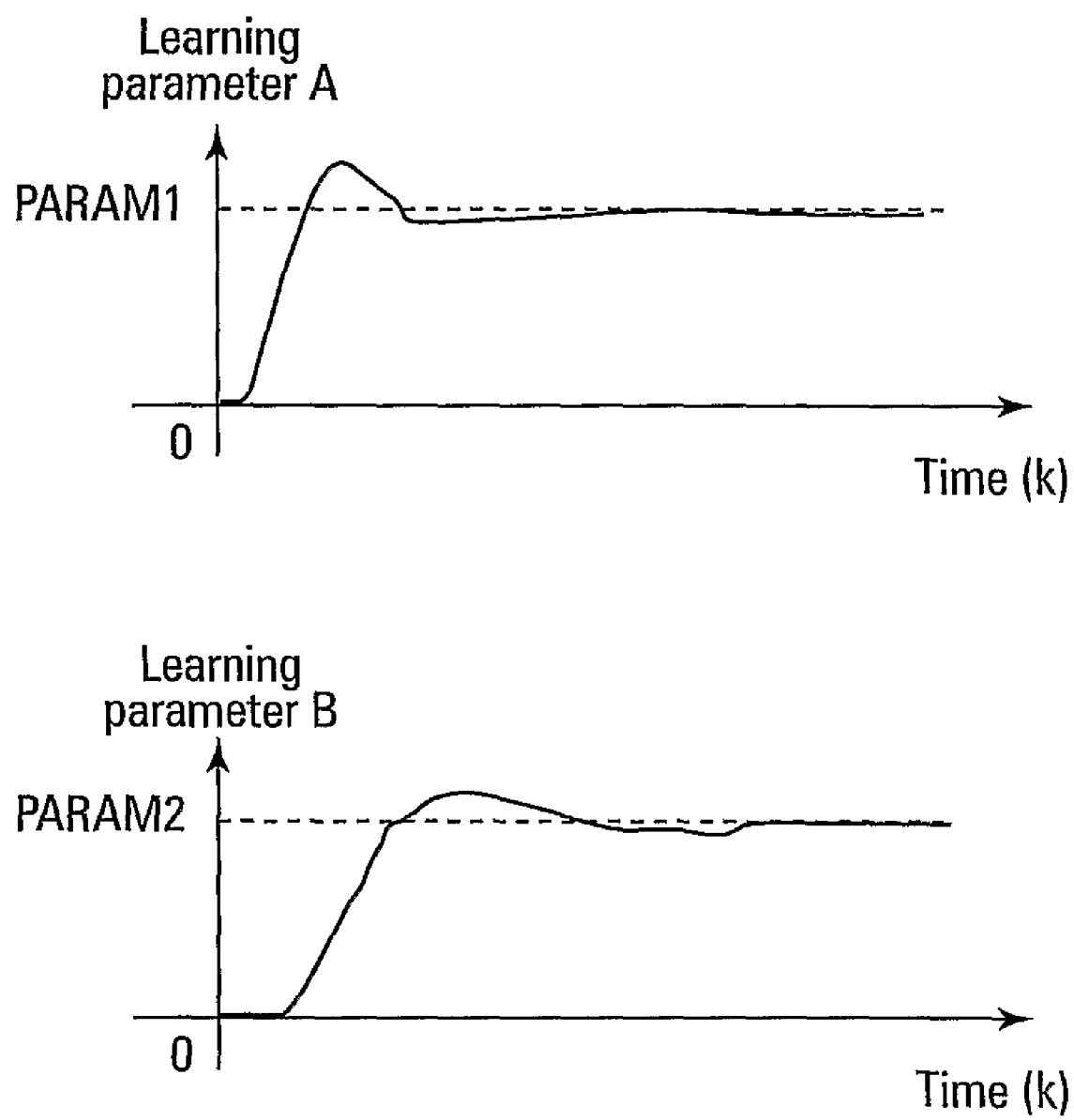
FIG. 12 details a graph showing the time changes in learning parameters A and B using the RLS algorithm.

At this point, there is a possibility that a large calculation error may occur in the P(k) element of the RLS shown in formula 12, with the passage of time, when fixed decimal point calculation is performed by controller 13, and as a result, incorrect learning commonly takes place. The reason for this is that it is assumed that P(k) is a characteristic that must always have a positive constant-value property and a symmetrical property, so when fixed decimal point calculations are repeated by controller 13, the positive fixed-constant property and symmetrical property deteriorate due to the effects of the quantization error. Therefore, for the embodiment of the present invention, UD decomposition is performed on P(k), and the upper triangular matrix U and the angle component D are each time-updated to prevent the occurrence of calculation errors due to quantization errors. When the true values of learning parameters A and B are A=PARAM1 and B=PARAM 2, the changes over time in learning parameters A and B using the RLS algorithm are as shown in FIG. 12. Other methods may be used to calculate the learning parameters, such as the maximum method or the batch least-squares method.

$$w^T(0)=[A(0),B(0)] \quad (4)$$

$$P(0)=I/\epsilon \quad (5)$$

$$w(k)=[A(k),B(k)]^T \quad (6)$$

$$y(k)=PMIV(k) \quad (7)$$

$$\Phi^T(k)=[PMIC(k),1] \quad (8)$$

$$e(k)=y(k)-\Phi^T(k)*w(k-1) \quad (9)$$

$$k(k)=(P(k-1)*\Phi(k))/(\lambda+\Phi^T(k)*P(k-1)*\Phi(k)) \quad (10)$$

$$w(k)=w(k-1)+k(k)*e(k) \quad (11)$$

$$P(k)=(1/\lambda)*\{P(k-1)-(P(k-1)*\Phi(k)*\Phi^T(k)*P(k-1))/(\lambda+\Phi^T(k)*P(k-1)*\Phi(k))\} \quad (12)$$

For these formulae, 1 is a single matrix, $\lambda$ is the weighting coefficient, $\epsilon$ is a small positive constant and for the least-squares method, $\lambda$ is 1 and for the weighted least-squares method, $0<\lambda<1$. RLS (recursive least-squares method) is described in detail in articles such as *System Identification for Control* (Tokyo Denki University Publishing House), *Adaptive Signal Processing Algorithm* (Baifukan) and *Adaptive Kalman Filter* (Asakura Shoten).

Figure 7:
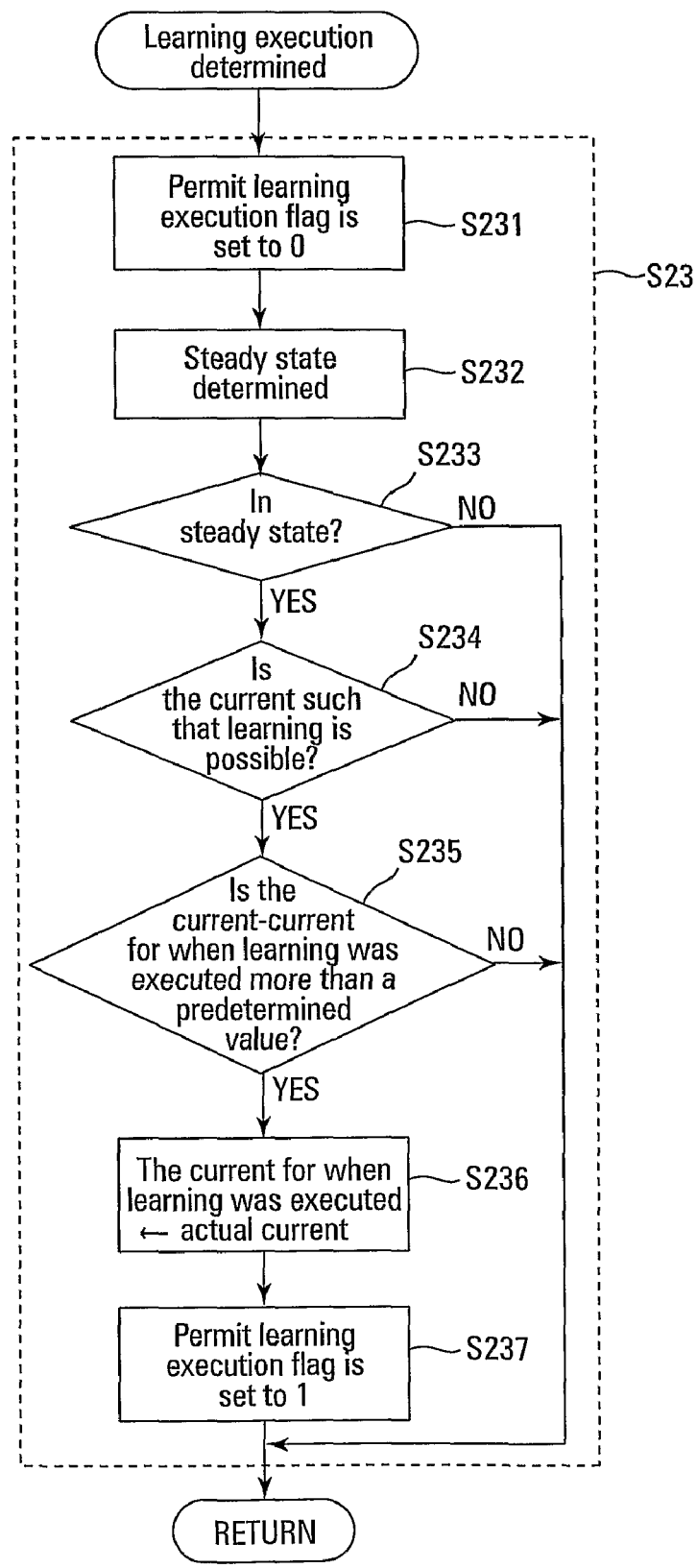
FIG. 7 details a flowchart showing the processing operation of the learning execution determination for Step S23 in FIG. 6.

Next is provided an explanation of the processing operation for the learning execution determination in Step S23 of FIG. 6, with reference to FIG. 7.

(A) First, at Step S231, learning execution-determining portion 52 sets the permit learning execution flag to 0 to perform initialization. Next, at Step S232, steady-state determining portion 53 determines the steady-state power generation of fuel cell stack 3 and eliminates the conditions in which stable measurements cannot be performed due to the operating conditions of the fuel cell system. At this point, when the dispersion value of the actual voltage of fuel cell stack 3 falls below a predetermined value, this is determined as a steady state, execution of the learning is permitted. Here, the maximum value, which is produced by the effects of the resolution of the sensor that detects the dispersion value of the actual voltage, is set as the predetermined value. In addition, other values caused by the operating conditions of the aforementioned fuel cell can also be used as the dispersion value, such as the actual current, the actual power, the operating pressure of fuel cell stack 3, the utilization rate of the fuel gas (hydrogen gas) or the utilization rate of the oxidant gas (air).

(B) Next, at Step S233, if a steady state was determined at Step S231, the process proceeds to Step S234, and if a steady state was not determined, the learning execution determination flow process shown in FIG. 7 is ended. In this case, since the permit learning execution flag is still set at 0, learning execution-determining portion 52 does not permit execution of the learning.

(C) At Step S234, current range determining portion 55 determines the range of current that can be learned and even if a steady state is determined at Step S233, the conditions in which stable measurements of the voltage cannot be performed due to the current taken from fuel cell stack 3 are eliminated.

Figure 13:
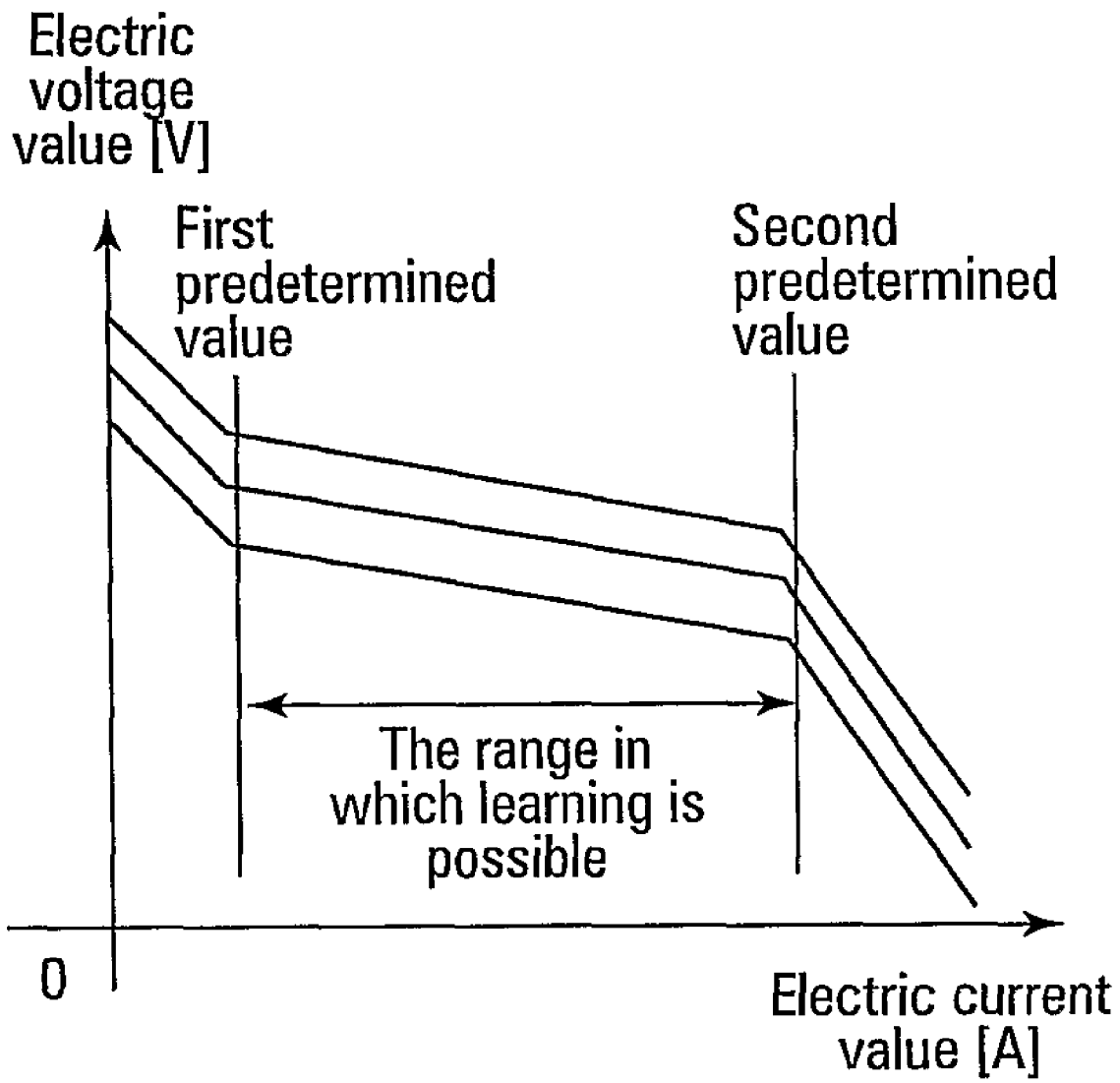
FIG. 13 details a graph for explaining the electric current range in which a stable measurement of the voltage can be obtained.

More specifically speaking, as shown in FIG. 13, current range determining portion 55 prohibits execution of the learning when the actual current is less than a first predetermined value or when it is more than a second predetermined value, which is larger than said first predetermined value. Execution of the learning is only permitted when the actual current is between the first predetermined value and the second predetermined value, which is the range in which learning can be executed.

Here, the range below the "First Predetermined Value" is the range in which the decrease in voltage of the activation polarization of a low electrode load (overly-activated voltage) becomes very noticeable and the range above the "Second Predetermined Value" is the range in which the decrease in voltage of the concentration polarization of a high electrode load (overly-concentrated voltage) becomes very noticeable. For ranges in which overly-activated voltage and overly-concentrated voltage becomes very noticeable, the change in the voltage increases in relation to the amount of change in the current and steady voltage cannot be detected. Therefore, when the actual current of fuel cell stack 3 is more than the first predetermined value and less than the second predetermined value, it is determined to be extracted current in which steady voltage can be measured, so the process proceeds to Step S235, and if this is not the case, then the learning execution determination is ended. In this case, since the permit learning execution flag is still set at 0, learning execution-determining portion 52 does not permit execution of the learning.

Figure 14:
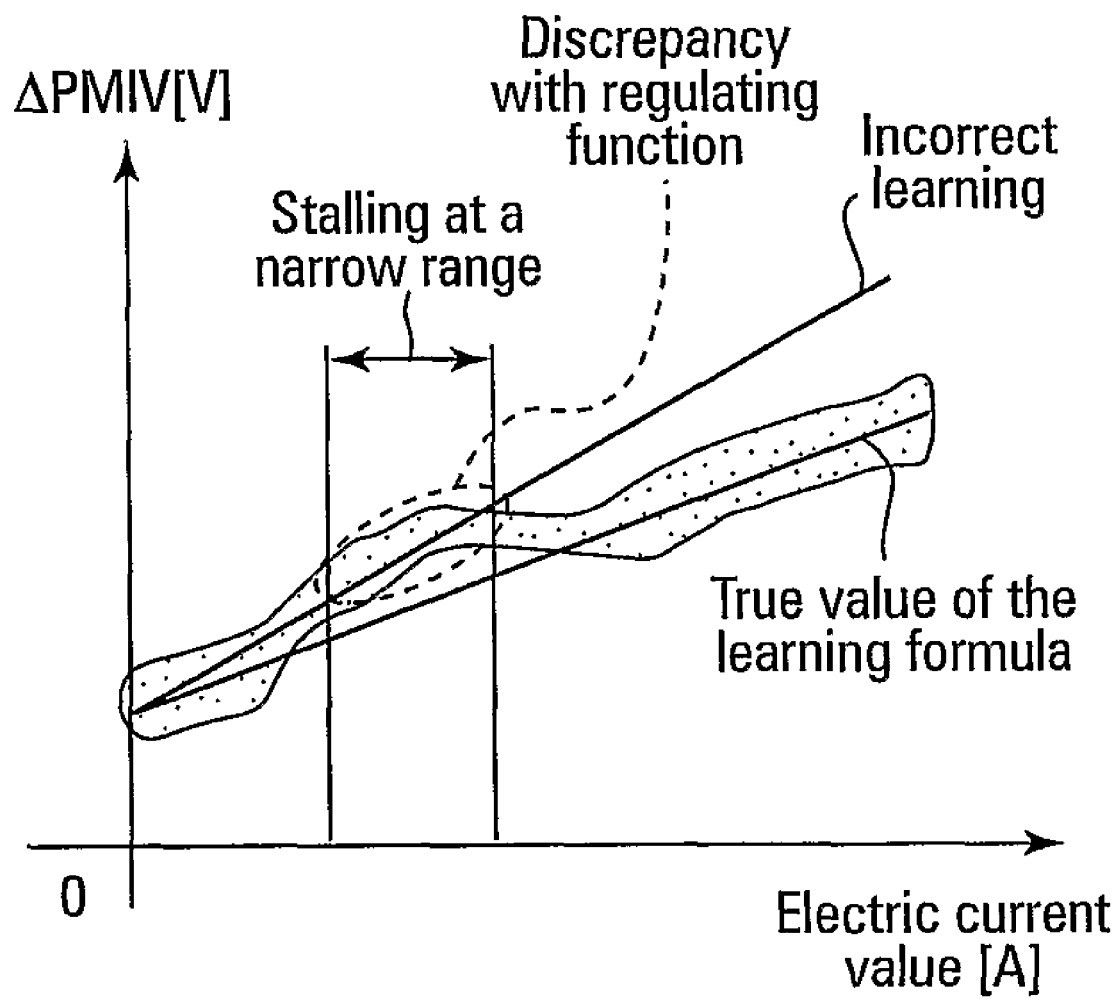
FIG. 14 details a graph showing one example of when incorrect learning takes place due to continuous execution of learning in a narrow range of operating conditions.

(D) At Step S235, current difference determining portion 54 prohibits execution of the learning when there is no change in the actual current for more than the predetermined value in relation to the actual current determined when execution of the learning was permitted. In other words, it determines to continually not execute the learning under a narrow range of operating conditions. As shown in FIG. 14, there is the possibility that incorrect learning may be performed when operating in a current range in which characteristics of the relationship between the difference in the base voltage and the actual voltage in relation to the actual current that cannot be expressed occur in relation to the learning formula used in Step S26 of FIG. 6. Therefore, when the absolute value of the difference in the actual current and the actual current for when the previous learning was executed is below the predetermined value (NO at Step S235), it determines to continually execute the learning under a narrow range of operating conditions and the learning execution determination is ended. And, if this is not the case, (YES at Step S235), the process proceeds to Step S236.

(E) At Step S236, learning execution-determining portion 52 determines that all of the learning execution conditions have been met (YES at all of Steps S233, S234 and S235), so the current taken from the fuel cell (actual current) is substituted for the learning execution current. Finally, at Step S237, the permit learning execution flag is set to 1 and the learning execution determination is ended.

After the flow process in FIG. 7 is completed, the process returns to Step S3 in FIG. 4 and controller 13 calculates the target current that is to be used for realizing the demanded power generation obtained at Step S1, based on learning parameters A and B learned at Step S2.

Figure 8:
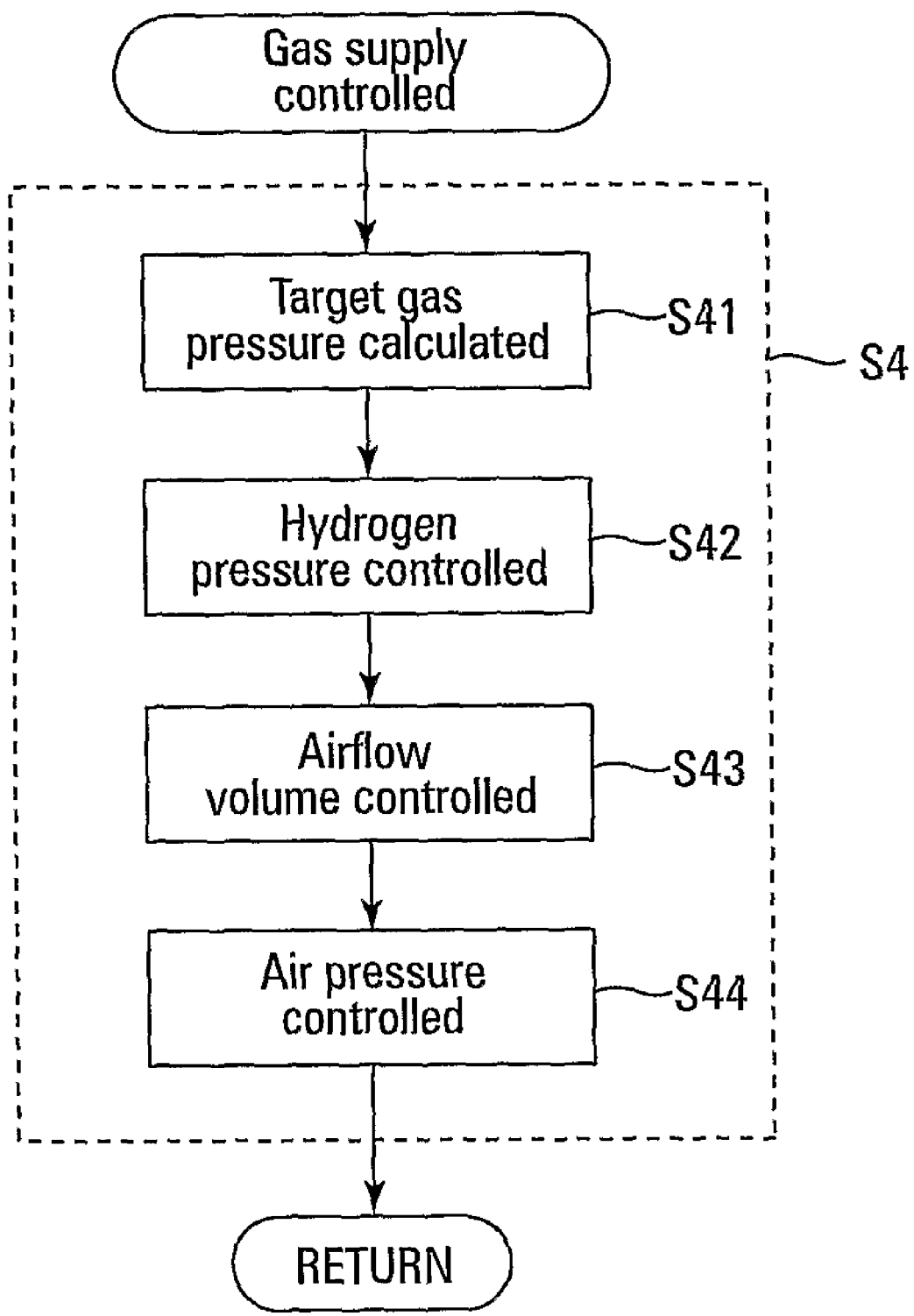
FIG. 8 details a flowchart showing the processing operation of the gas supply control for Step S4 in FIG. 4.

Next is provided an explanation of the processing operation for the gas supply control in Step S4 of FIG. 4, with reference to FIG. 8. At Step S4, gas supply control of the hydrogen gas and air, which is for realizing the target current calculated at Step S3, is performed.

Figure 15:
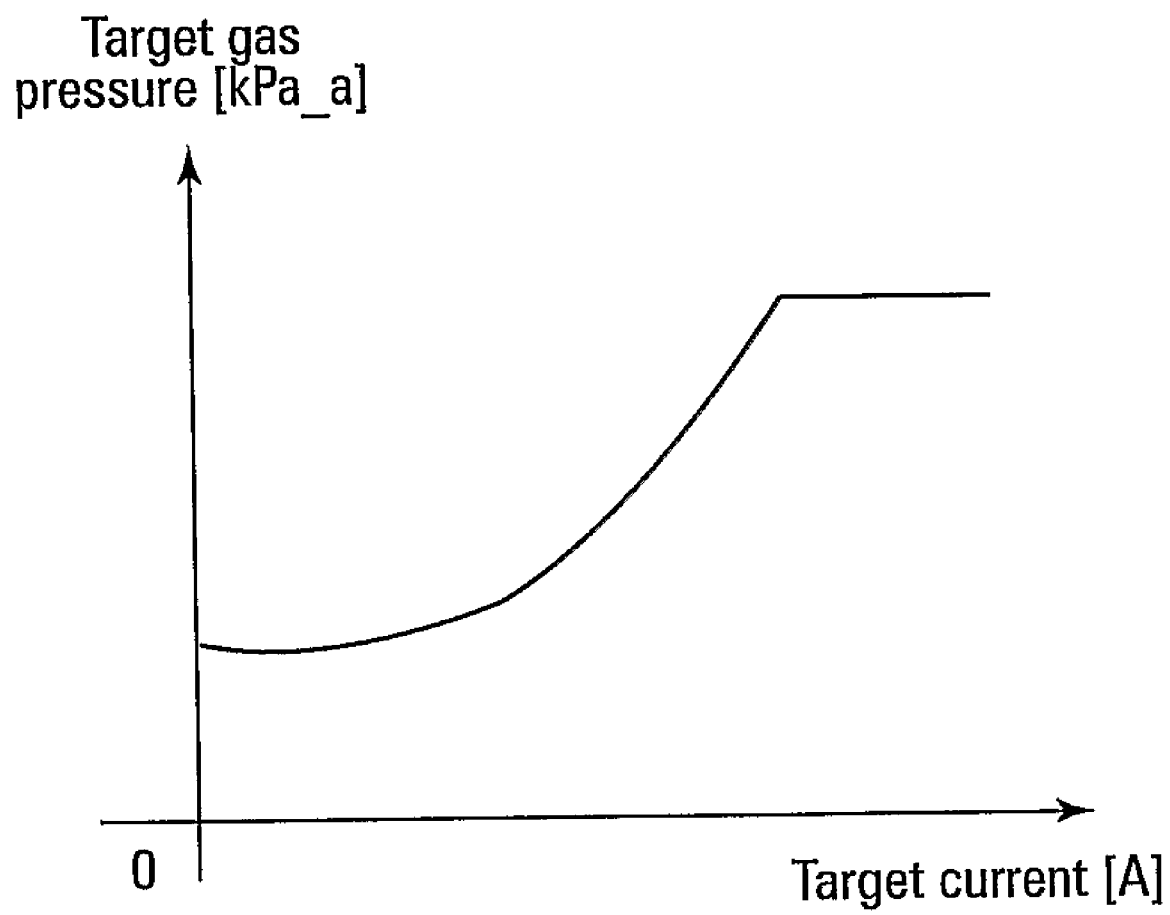
FIG. 15 details a graph showing one example of table data showing the relationship of the target gas pressure in relation to the target current.

(a) At Step S41, controller 13 calculates the target gas pressure. This target gas pressure is calculated using the table data shown in FIG. 15, based on the target current. The table data in FIG. 15 is set with consideration given to the power generation efficiency of fuel cell stack 3.

(b) The process then proceeds to Step S42 and controller 13 performs control of the hydrogen gas pressure. The hydrogen gas pressure is controlled by operating hydrogen pressure control valve 14 in accordance with the target gas pressure. Operation of hydrogen pressure control valve 14 is carried out by deciding an opening command for the hydrogen pressure control valve via feedback control based on the deviation between the target gas pressure and the hydrogen gas pressure detected by hydrogen supply inlet pressure sensor 9 arranged in the vicinity of the hydrogen supply inlet. This feedback control can be configured using a well-known method, such as PI control or prescriptive model-based control. In addition, the opening command for hydrogen pressure control valve 14 that is calculated in this step is instructed from controller 13 to the drive circuit of hydrogen pressure control valve 14 and hydrogen pressure control valve 14 is driven in accordance with the opening command.

Figure 16:
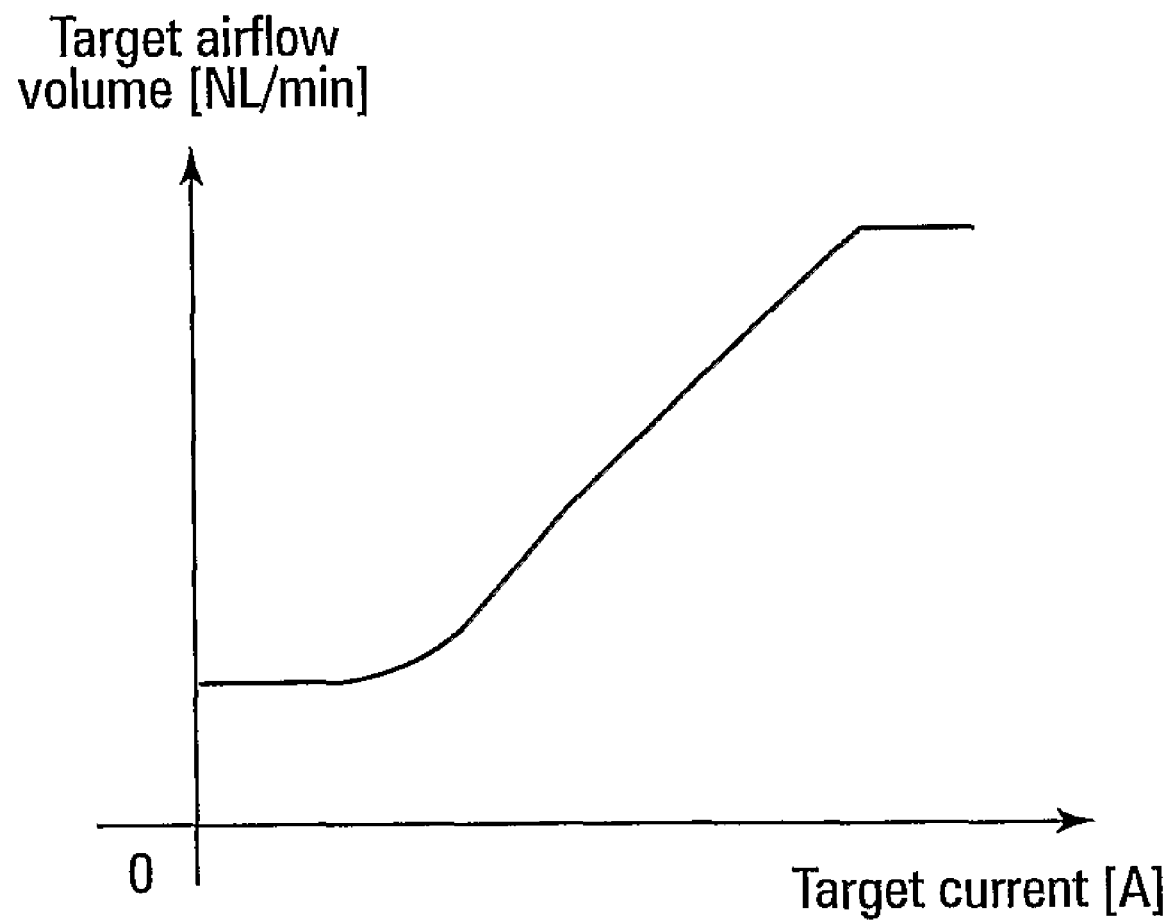
FIG. 16 details a graph showing one example of table data showing the relationship of the target airflow volume in relation to the target current.

(c) Next, at Step S43, controller 13 controls the amount of airflow. At this step, first, the target amount of airflow is calculated using the table data shown in FIG. 16, based on the target current. This table data is set for an air utilization rate in which localized air supply insufficiencies do not occur inside of fuel cell stack 3.

Figure 17:
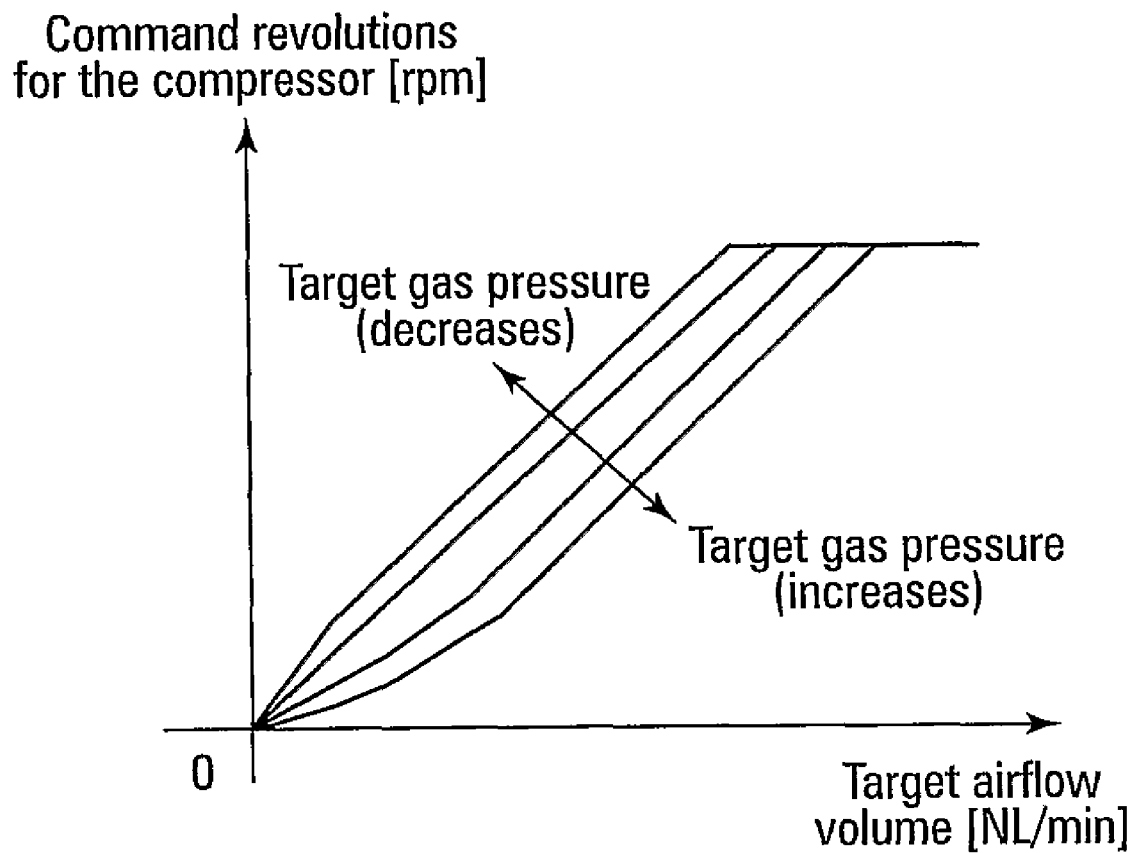
FIG. 17 details a graph showing one example of table data showing the relationship of the revolutions command for the compressor in relation to the target airflow volume for each target gas pressure.

Next, the revolutions command for the compressor is calculated using the mapped data shown in FIG. 17, based on the target gas pressure and target airflow volume obtained at Step S41. The mapped data in FIG. 17 is set on the basis of the characteristics of the airflow volume in relation to the number of revolutions of compressor 6 and the pressure ratio. In addition, the revolutions command for the compressor calculated at this step is instructed from controller 13 to the drive circuit of compressor 6 and compressor 6 is driven in accordance with the revolutions command.

(d) Finally, at Step S44, controller 13 controls the air pressure. At this step, the air pressure is controlled by operating air pressure control valve 12 in accordance with the target gas pressure. Operation of air pressure control valve 12 is carried out by deciding the opening command for air pressure control valve 12 via feedback control based on the deviation between the target gas pressure and the air pressure inside of fuel cell stack 3 detected by air supply inlet pressure sensor 15 arranged in the vicinity of the air supply inlet. This feedback control can be configured using a well-known method, such as PI control or prescriptive model-based control. In addition, the opening command for air pressure control valve 12 that is calculated in this step is instructed from controller 13 to the drive circuit of air pressure control valve 12 and air pressure control valve 12 is driven in accordance with the opening command.

After executing the gas supply control flow process in FIG. 8, the process returns to Step S5 in FIG. 4 and electric power generation of fuel cell stack 3 is controlled in accordance with the demanded power generation obtained at Step S1. The demanded power generation is instructed from controller 13 to power control device 24 and electric power generation in fuel cell stack 3 is controlled in accordance with the electric power command.

The series of operations shown in FIG. 4~FIG. 8 can be performed using equivalent algorithm programs to control the control device (controller 13) for the fuel cell system shown in FIG. 1. This program can be memorized by the program memory device (not shown in the drawing) of the computer system comprising controller 13. In addition, this program can also be stored in a recording medium that can be read by a computer and this recording medium can be read by the program memory device of controller 13 in order to perform the series of operations shown in FIG. 4~FIG. 8. A "recording medium that can be read by a computer" means a medium, or the like, that can record a program, such as an external memory device for a computer, a semiconductor memory, magnetic desk, optical disk, opto-magnetic disk, or a magnetic tape. More specifically, a flexible disk, CD-ROM, MO disk and a cassette tape are also considered to be "recording mediums that can be read by a computer".

For the control device of one embodiment, the memory portion 36 memorizes the output characteristics of fuel cell stack 3 for each temperature that become the base characteristics and output characteristics learning portion 35 learns the relationship between the output characteristics that become the base characteristics and the actual output characteristics of fuel cell stack 3. Due to this, there is no need to learn the changes that take place in the output characteristics in accordance with the temperature of fuel cell stack 3. Therefore, even when the output characteristics of fuel cell stack 3 change in accordance with the change in temperature of fuel cell stack 3, it is possible to accurately learn the output characteristics of fuel cell stack 3.

For the control device of another embodiment, the base output calculation portion 40 calculates the base output using the output characteristics of fuel cell stack 3 that become the base characteristics and output difference learning portion 41 can learn the output characteristics of fuel cell stack 3 from the difference between this base output and the actual output of fuel cell stack 3, thus allowing for accurate learning of the output characteristics of fuel cell stack 3.

For the control device of yet another embodiment, the output characteristics become the current/voltage characteristics of fuel cell stack 3. In this case, the amount of change in the characteristics of the current and voltage for fuel cell stack 3 over a wide range is generally small. Therefore, the output characteristics of fuel cell stack 3 can be learned using the relationship of the small amount of change in the characteristics over a wide range, so stable detection of the data required for the learning is possible and the output characteristics of fuel cell stack 3 can be accurately learned. In addition, since the change in the output characteristics of fuel cell stack 3 that correspond with the current that correlates with the amount of gas supplied to fuel cell stack 3 is learned, the changes in the output characteristics become easier to extend to the gas control.

For the control device of a further embodiment, the base voltage calculation portion 50 calculates the base voltage of fuel cell stack 3 using the current/voltage characteristics that become the base characteristics based on the operating conditions (actual current) of fuel cell stack 3 and voltage difference learning portion 51 learns the relationship between the actual current and the difference between the base voltage and actual voltage. Based on this, the decrease in voltage in relation to the current of fuel cell stack 3 can be learned from the difference between the base voltage obtained from the base current/voltage characteristics of fuel cell stack 3 and the actual voltage of fuel cell stack 3 and the changes in the output of fuel cell stack 3 can be easily discovered.

For the control device of yet a further embodiment, the base voltage calculation portion 50 calculates the base voltage from the actual current and the temperature of fuel cell stack 3. Based on this, the base voltage of fuel cell stack 3 can be calculated in accordance with the actual current and the temperature of fuel cell stack 3 as the operating conditions of fuel cell stack 3. Therefore, even if the current or temperature changes, the relationship between the base voltage and the actual voltage can be learned.

For the control device of another embodiment, the voltage difference learning portion 51 approximates the relationship between the actual current and the difference between the base voltage and the actual voltage as a linear function. Due to this, the learning logic can be configured using a simple configuration, such as a linear function. In addition, by using a function in which the change in the learned value is small depending upon the amount of current, such as a linear function, the accuracy of the learning can be improved even when the operating conditions are restricted.

For the control device of yet another embodiment, the learning execution-determining portion 52 permits the execution of the learning only when the operating conditions of fuel cell stack 3 are within a range in which the input/output relationship is stable and learning can be performed. Due to this, the accuracy of the learning can be improved. Here, the input/output relationship is the actual current of fuel cell stack 3 for the operating condition, as the input, and the difference between the base voltage and the actual voltage, as the output.

For the control device of a further embodiment, the steady-state determining portion 53 only permits the execution of the learning when the operating conditions of fuel cell stack 3 are in a steady state. Therefore, incorrect learning due to changes in the current and voltage that occur when the load to fuel cell stack 3 changes can be prevented, resulting in more accurate learning of the current/voltage characteristics of fuel cell stack 3.

A common method for determining a steady-state power generation operation can easily be conceived due to the concern relating to measurement errors in the resolution of the sensor that detects the operating conditions of fuel cell stack 3 by determining the amount of change in the current value and the previous value after low-path filtering has been performed. However, since the high-frequency component is eliminated and the phase also gets delayed, steady-state power generation is incorrectly determined. Therefore, for the control device of yet a further embodiment, the steady-state determining portion 53 permits execution of the learning when the dispersion value of the operating conditions of fuel cell stack 3, including the actual voltage of fuel cell stack 3, fall below a predetermined value. By using the dispersion value for the operating conditions of fuel cell stack 3, as was the case with the actual voltage, steady-state power generation in which the high-frequency component is not eliminated and a delay in the phase does not occur can be determined. Therefore, accurate determination of the steady-state power generation operation becomes possible and the current/voltage characteristics of fuel cell stack 3 can be accurately learned.

For the control device of another embodiment, the current difference determining portion 54 prohibits execution of the learning when there is no change in the actual current of fuel cell stack 3 for a predetermined value or more in relation to the actual current that was generated when execution of the learning was permitted. Therefore, execution of the learning can be prohibited when the load to fuel cell stack 3 is restricted. When the current of fuel cell stack 3 is restricted to a narrow range, although actual discrepancies occur in the resolution of the sensor that detects the voltage of fuel cell stack 3 and the learning formula in relation to narrow current ranges, creating the risk of incorrect learning, this type of incorrect learning can be prevented and the current/voltage characteristics of fuel cell stack 3 can be accurately learned.

For the control device of yet another embodiment, the current range determining portion 55 prohibits the execution of the learning when the actual current is less than the first predetermined value or more than the second predetermined value, which is larger than the first predetermined value. Here, the range that is less than "The First Predetermined Value" is the range in which the decrease in voltage of the activation polarization of a low electrode load becomes very noticeable and the range that is more than the "Second Predetermined Value" is the range in which the decrease in voltage of the concentration polarization of a high electrode load becomes very noticeable. For these ranges, updating of the learning can be prohibited for ranges in which the voltage sensitivity is high in relation to the amount of change in the current of fuel cell stack 3. Therefore, stable measurement of the voltage of fuel cell stack 3 can be performed and the current/voltage characteristics of fuel cell stack 3 can be accurately learned.

In addition, the operational effects explained below can also be achieved by the embodiment for the present invention.

The operating temperature of a fuel cell stack installed in a vehicle is not steady in relation to the output due to the effects of the operation of the vehicle by the driver and the external air conditions. When the current/voltage characteristics are approximated using a function in which the horizontal axis is the current and the vertical axis is the voltage, the temperature sensitivity and the estimation accuracy of the current/voltage characteristics deteriorate.

Therefore, an estimate is obtained by approximating the changes in the current/voltage characteristics (IV characteristics) of the fuel cell stack as a function of the deviation ($\Delta$ PMIV) between the current in the horizontal axis and the nominal IV characteristic (ROM constant) in the vertical axis and the actual voltage (refer to FIG. 11 and Formula 3). By conducting an estimate using the deviation between the nominal IV characteristics (ROM constant), which have temperature sensitivity, and the actual voltage, the effects on the temperature due to the operating of the vehicle by the driver and changes in the external temperature can be controlled, resulting in improved accuracy in learning the current/voltage characteristics.

In addition, since there are communication delays in the CAN (Controller Area Network) in relation to the calculation of the nominal IV characteristics (ROM constant) and in the measurement of the actual voltage, the communication delay in the CAN and the delay in the PM response are taken into consideration when calculating the aforementioned deviation, which allows for accurate learning of the current/voltage characteristics.

In addition, the function used to perform the estimation is a linear function, or, the voltage difference=A×current+B, as shown in Formula 3, for example. By performing the approximation using a linear function, the deterioration of the rated vicinity can be estimated for learned data at any load (current).

When using a least-squares method, such as RLS, to produce the estimate, the order of the current is decreased in order to increase the order of learning parameter A. By making the order of coefficients, or, parameters A and B closer, the quantization errors in fixed-decimal point design become minimal and the current/voltage characteristics can be accurately learned.

In addition, learning is updated when it changes to a predetermined load or more from the point of operation for the previous learning. Although the approximation was performed as a linear function, in actuality, measurement errors or slight discrepancies in the characteristics may occur. Therefore, when learning takes place under a narrow range of operation, there is a possibility that incorrect learning will take place. Due to this, when a deviation of more than a predetermined load over the load that was previously learned (current) occurs, incorrect learning can be prevented by updating the learning.

As explained above, the present invention was explained using one embodiment, but it should not be interpreted that this invention is limited to the description or drawings in any part of this disclosure. In addition, it is obvious from this disclosure that any other form of implementation, embodiment or operating technology could be conceived by a person skilled in the art. In other words, it should be interpreted that the present invention encompasses various other embodiments not described herein. Therefore, the present invention is only limited to specific items of the invention pertaining to the appropriate scope of claims disclosed by the present invention.

CONCLUSION

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fuel cell controlling system for controlling an electric power output from a fuel cell in which a fuel gas and an oxidant gas are supplied to the fuel cell to generate the electric power output, comprising:
   a controller to control the operation of a fuel cell, the controller comprising:
   a memory portion adapted to store one or more base output characteristics of the fuel cell for each of a plurality of operating temperatures of the fuel cell; and
   an output characteristics learning portion adapted to learn a relationship between one or more actual output characteristics of the fuel cell and the one or more base output characteristics stored in the memory portion for each of the plurality of operating temperatures;
   wherein the controller is adapted to utilize the learned relationship between the one or more actual output characteristics and the one or more base characteristics in controlling operation of the fuel cell; and
   wherein the output characteristics learning portion is adapted to prohibit learning when an actual current is less than a first predetermined current and more than a second predetermined current.

2. The fuel cell controlling system of claim 1, wherein the one or more base output characteristics and the one or more actual output characteristics of the fuel cell include one or more of an output current, an output voltage, and an output power.

3. The fuel cell controlling system of claim 1, wherein the learned relationship is one or more differences or one or more ratios between a base output characteristic and an actual output characteristic.

4. The fuel cell controlling system of claim 1, wherein the output characteristics learning portion is adapted to calculate the one or more base output characteristics and is adapted to receive measurements of the one or more actual output characteristics to learn the relationship between one or more actual output characteristics of the fuel cell and the one or more base output characteristics.

5. The fuel cell controlling system of claim 4, further comprising:
   means for detecting a current; and
   means for detecting a voltage.

6. The fuel cell controlling system of claim 4, wherein a base voltage characteristic is calculated from an actual current characteristic and a temperature of the fuel cell.

7. The fuel cell controlling system of claim 1, wherein the output characteristics learning portion is adapted to approximate the relationship between an actual current and the difference between an actual voltage and a base voltage as a linear function.

8. The fuel cell controlling system of claim 1, wherein the output characteristics learning portion is adapted to permit learning only within a range of operating conditions where an input/output relationship of the fuel cell is stable.

9. The fuel cell controlling system of claim 8, wherein the output characteristics learning portion further comprises means for determining a steady state of operation of the fuel cell.

10. The fuel cell controlling system of claim 9, wherein the output characteristics learning portion is adapted to permit learning when the means for determining a steady state of operation of the fuel cell determines the steady state of operation of the fuel cell and when a dispersion value of the operating condition of the fuel cell falls below a predetermined value; wherein the operating condition is determined by one or more of an actual voltage, an actual current, an actual output power, an operating pressure, a fuel gas utilization rate, and an oxidant gas utilization rate of the fuel cell.

11. The fuel cell controlling system of claim 1, wherein the output characteristics learning portion is adapted to prohibit learning when there is no change in an actual current for an operating condition of the fuel cell from a previously learned actual current at the operating condition.

12. A fuel cell system, comprising:
   a fuel cell that generates an electric power by supplying fuel gas and oxidant gas; and
   a controller coupled to the fuel cell, wherein the fuel cell controller is adapted to store a base output characteristic of the fuel cell for one or more fuel cell operating conditions and where the fuel cell controller is adapted to learn a relationship between an actual output characteristic and the base output characteristic at the one or more fuel cell operating conditions for utilization by the fuel cell controller to control the operation of the fuel cell;
   wherein the fuel cell controller is adapted to learn the relationship between an actual output characteristic and the base output characteristic only within a range of one or more fuel cell operating conditions where an input/output relationship of the fuel cell is stable.

13. The fuel cell system of claim 12, wherein the base output characteristic of the fuel cell includes one or more of a base output current, a base output voltage, and a base output power; and wherein the actual output characteristic includes one or more of an actual output current, an actual output voltage, and an actual output power.

14. The fuel cell system of claim 12, wherein the learned relationship between the base output characteristic and the actual output characteristic is one of a difference and a ratio.

15. The fuel cell system of claim 12, wherein the fuel cell controller is adapted to calculate the base output characteristic and is adapted to measure the actual output characteristic to learn the relationship between the actual output characteristic and the base output characteristic of the fuel cell.

16. The fuel cell system of claim 15, wherein the calculated base output characteristic is a base output voltage characteristic that is calculated from an actual current output characteristic and a temperature of the fuel cell.

17. The fuel cell system of claim 12, wherein the fuel cell controller is adapted to approximate the relationship between an actual output current and the difference between an actual output voltage and a base output voltage as a linear function.

18. The fuel cell system of claim 12, wherein the fuel cell controller is adapted to determine when the fuel cell is in a stable steady state of operation.

19. The fuel cell system of claim 18, wherein the fuel cell controller is adapted to determine a steady state of operation and to learn the relationship between an actual output characteristic and the base output characteristic when a dispersion value of an operating condition of the fuel cell falls below a predetermined value and where the operating condition is determined by one or more of an actual voltage, an actual current, an actual output power, an operating pressure, a fuel gas utilization rate, and an oxidant gas utilization rate of the fuel cell.

20. The fuel cell system of claim 12, wherein the fuel cell controller is adapted to prohibit learning the relationship between the actual output characteristic of the fuel cell and the base output characteristic when there is no change in an actual output current for an operating condition of the fuel cell from a previously learned actual output current at the operating condition.

21. The fuel cell system of claim 12, wherein the fuel cell controller is adapted to prohibit learning the relationship between the actual output characteristic of the fuel cell and the base output characteristic when an actual output current is less than a first predetermined current and is more than a second predetermined current.

22. A method of learning the characteristics of a fuel cell, comprising:
    storing in a memory of a fuel cell controller a base output characteristic of the fuel cell for one or more fuel cell operating conditions;
    determining a relationship with the fuel cell controller between an actual output characteristic and the base output characteristic at the one or more fuel cell operating conditions; and
    prohibiting determining the relationship between the actual output characteristic of the fuel cell and the base output characteristic when there is no change in an actual output current for an operating condition of the fuel cell from a previously learned actual output current at the operating condition.

23. The method of claim 22, wherein the base output characteristic of the fuel cell includes one or more of a base output current, a base output voltage, and a base output power; and wherein the actual output characteristic includes one or more of an actual output current, an actual output voltage, and an actual output power.

24. The method of claim 22, wherein determining a relationship between an actual output characteristic and the base output characteristic at the one or more fuel cell operating conditions further comprises determining one of one of a difference and a ratio between the base output characteristic and the actual output characteristic.

25. The method of claim 22, further comprising:
    calculating the base output characteristic; and
    measuring the actual output characteristic.

26. The method of claim 25, wherein calculating the base output characteristic further comprises calculating a base output voltage characteristic from an actual current output characteristic and a temperature of the fuel cell.

27. The method of claim 22, further comprising:
    approximating a relationship between an actual output current and the difference between an actual output voltage and a base output voltage as a linear function.

28. The method of claim 22, wherein determining a relationship between an actual output characteristic and the base output characteristic at the one or more fuel cell operating conditions further comprises determining a relationship between an actual output characteristic and the base output characteristic only within a range of one or more fuel cell operating conditions where an input/output relationship of the fuel cell is stable.

29. The method of claim 28, further comprising:
    determining when the fuel cell is in a stable steady state of operation.

30. The method of claim 28, wherein determining a relationship between an actual output characteristic and the base output characteristic only within a range of one or more fuel cell operating conditions where an input/output relationship of the fuel cell is stable further comprises determining a relationship between an actual output characteristic and the base output characteristic when a dispersion value of an operating condition of the fuel cell falls below a predetermined value and where the operating condition is determined by one or more of an actual output voltage, an actual output current, an actual output power, an operating pressure, a fuel gas utilization rate, and an oxidant gas utilization rate of the fuel cell.

31. The method of claim 22, further comprising:
    prohibiting determining the relationship between an actual output characteristic and the base output characteristic at the one or more fuel cell operating conditions when an actual output current is less than a first predetermined current and more than a second predetermined current.

* * * * *